(12) United States Patent
Zhang et al.

(10) Patent No.: US 11,281,885 B2
(45) Date of Patent: Mar. 22, 2022

(54) METHOD FOR FINGERPRINT RECOGNITION, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Haiping Zhang, Guangdong (CN); Biao Chen, Guangdong (CN); Wenxi Zhan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 52 days.

(21) Appl. No.: 16/832,999

(22) Filed: Mar. 27, 2020

(65) Prior Publication Data
US 2020/0311380 A1 Oct. 1, 2020

(30) Foreign Application Priority Data
Apr. 1, 2019 (CN) .......................... 201910265453.X

(51) Int. Cl.
*G06K 9/00* (2006.01)
*G06T 5/00* (2006.01)
*G06T 5/50* (2006.01)

(52) U.S. Cl.
CPC ....... *G06K 9/00087* (2013.01); *G06K 9/0004* (2013.01); *G06T 5/002* (2013.01); *G06T 5/50* (2013.01); *G06K 2009/0006* (2013.01)

(58) Field of Classification Search
CPC ............. G06K 9/00087; G06K 9/0004; G06K 2009/0006; G06T 5/002; G06T 5/50
See application file for complete search history.

(56) References Cited

U.S. PATENT DOCUMENTS

| 8,472,679 B2 * | 6/2013 | Abiko ................... G06K 9/036 382/115 |
| 2006/0056700 A1 | 3/2006 | Abiko et al. |

(Continued)

FOREIGN PATENT DOCUMENTS

| CN | 102782724 | 11/2012 |
| CN | 105469083 | 4/2016 |

(Continued)

OTHER PUBLICATIONS

WIPO, English translation of the ISR and WO for PCT/CN2020/082212, dated Jul. 3, 2020.

(Continued)

*Primary Examiner* — Utpal D Shah
(74) *Attorney, Agent, or Firm* — Hodgson Russ LLP

(57) ABSTRACT

Provided are a method for fingerprint recognition, an electronic device, and a non-transitory computer-readable storage medium. The method is applicable to the electronic device. The method includes the following. An image of a user's finger placed on a fingerprint collecting region of a display screen of the electronic device is collected as an original fingerprint image. A corrected fingerprint image is obtained according to the original fingerprint image and a predetermined foreign material image, where the predetermined foreign material image is obtained when the user's finger is not placed on the fingerprint collecting region and indicative of a foreign material on the fingerprint collecting region. Determine whether a match between the corrected fingerprint image and a pre-stored fingerprint image exists by comparing the corrected fingerprint image with the pre-stored fingerprint image. The electronic device is triggered to perform a preset action in response to that the match exists.

19 Claims, 21 Drawing Sheets

Determining whether an overlap region between the original fingerprint image and the predetermined foreign material image exists ~~~ 131-I Determining a part of the original fingerprint image other than the overlap region between the original fingerprint image and the predetermined foreign material image as the corrected fingerprint image, in response to that the overlap region between the original fingerprint image and the predetermined foreign material image exists ~~~ 132-I

(56) References Cited

U.S. PATENT DOCUMENTS

| | | | |
|---|---|---|---|
| 2013/0308834 A1 | 11/2013 | Suzuki et al. | |
| 2017/0235998 A1* | 8/2017 | Jin | G06K 9/00013 |
| | | | 382/124 |
| 2018/0189546 A1 | 7/2018 | Chang et al. | |
| 2019/0251393 A1* | 8/2019 | Jiang | G06K 9/00087 |
| 2021/0264575 A1* | 8/2021 | Zhang | G06T 5/005 |

FOREIGN PATENT DOCUMENTS

| | | | |
|---|---|---|---|
| CN | 106203365 | | 12/2016 |
| CN | 106447657 | | 2/2017 |
| CN | 106991402 A | | 7/2017 |
| CN | 107430680 A | | 12/2017 |
| CN | 107665079 A | | 2/2018 |
| CN | 108288050 | | 7/2018 |
| CN | 108509944 | | 9/2018 |
| CN | 108509944 A | * | 9/2018 |
| CN | 109376630 | | 2/2019 |
| CN | 109389071 | | 2/2019 |
| CN | 109446940 | | 3/2019 |
| GB | 2551752 | | 1/2018 |
| WO | WO-2020063111 A1 | * | 4/2020 |

OTHER PUBLICATIONS

EPO, Office Action for EP Application No. 20167260.7, dated Sep. 16, 2020.

SIPO, First Office Action for CN Application No. 201910265453.X, dated Sep. 3, 2020.

Mei, "Examinee Identity Authentication System Based on Fingerprint Identification," Digital Technology & Application, Jul. 2018, vol. 36, No. 7, 2 pages.

Kwon et al., "Rolled Fingerprint Construction Using MRF-Based Nonrigid Image Registration," IEEE Transactions on Image Processing, Dec. 2010, vol. 19, No. 12, pp. 3255-3270.

The second office action issued in corresponding CN application No. 201910265453.X dated Apr. 23, 2021.

IPI, Office Action for IN Application No. 202014013925, dated Nov. 3, 2021.

* cited by examiner

METHOD FOR FINGERPRINT RECOGNITION, ELECTRONIC DEVICE, AND NON-TRANSITORY COMPUTER-READABLE STORAGE MEDIUM

CROSS-REFERENCE TO RELATED APPLICATION

This application claims priority to Chinese Patent Application No. 201910265453X, filed Apr. 1, 2019, the entire disclosure of which is incorporated herein by reference.

TECHNICAL FIELD

This disclosure relates to the field of biological recognition technologies, and particularly to a method for fingerprint recognition, an electronic device, and a non-transitory computer-readable storage medium.

BACKGROUND

With the development of technologies, electronic devices such as smart phones can support an increasing number of applications and are becoming more powerful. The electronic device is also becoming diversified and personalized. The electronic device generally has a fingerprint recognition function. "Fingerprints" are lines formed by concave and convex skin on the fingertips of human fingers. Since the human fingerprints depend on genes and environment, they are also closely related to human health. Everyone has fingerprints, but they are all different. Since the fingerprint has an extremely low repetition rate, about one in 15 billion, it is also called a "human identification (ID) card". Based on such feature, the fingerprint is widely used as authentication information. The accuracy of the fingerprint recognition has a direct impact on user's use efficiency for the electronic device, and therefore how to improve the accuracy of the fingerprint recognition is an important research direction for those skilled in the art.

SUMMARY

Implementations provide a method for fingerprint recognition. The method is applicable to an electronic device and includes the following. An image of a user's finger placed on a fingerprint collecting region of a display screen of the electronic device is collected as an original fingerprint image, where the fingerprint collecting region is a part of display region or the whole display region of a display screen of the electronic device. A corrected fingerprint image is obtained according to the original fingerprint image and a predetermined foreign material image, where the predetermined foreign material image is obtained when the user's finger is not placed on the fingerprint collecting region and indicative of a foreign material on the fingerprint collecting region. Determine whether a match between the corrected fingerprint image and a pre-stored fingerprint image exists by comparing the corrected fingerprint image with the pre-stored fingerprint image. The electronic device is triggered to perform a preset action in response to that the match exists.

Implementations further provide an electronic device. The electronic device includes a display screen, a fingerprint sensor, a processor, and a memory. The display screen has a display region and a fingerprint collecting region, and the fingerprint collecting region is a part of the display region or the whole display region. The fingerprint sensor is disposed below the fingerprint collecting region and configured to collect an image of a user's finger placed on the fingerprint collecting region as an original fingerprint image. The memory stores computer programs which, when executed by the processor, are operable with the processor to: obtain a corrected fingerprint image according to the original fingerprint image and a predetermined foreign material image, where the predetermined foreign material image is obtained when the user's finger is not placed on the fingerprint collecting region and indicative of a foreign material on the fingerprint collecting region; determine whether a match between the corrected fingerprint image and a pre-stored fingerprint image exists by comparing the corrected fingerprint image with the pre-stored fingerprint image; trigger the electronic device to perform a preset action in response to that the match exists.

Implementations further provide a non-transitory computer-readable storage medium. The non-transitory computer-readable storage medium is configured to store computer readable programs which, when executed by a processor, are operable with the processor to: collect an image of a user's finger placed on a fingerprint collecting region as an original fingerprint image; obtain a corrected fingerprint image according to the original fingerprint image and a predetermined foreign material image, wherein the predetermined foreign material image is obtained when the user's finger is not placed on the fingerprint collecting region and indicative of a foreign material on the fingerprint collecting region; determine whether a match between the corrected fingerprint image and a pre-stored fingerprint image exists by comparing the corrected fingerprint image with the pre-stored fingerprint image; trigger the electronic device to perform a preset action in response to that the match exists.

BRIEF DESCRIPTION OF THE DRAWINGS

To describe technical solutions in implementations of the disclosure more clearly, the following briefly introduces accompanying drawings required for illustrating the implementations. Apparently, the accompanying drawings in the following description illustrate some implementations. Those of ordinary skill in the art may also obtain other drawings based on these accompanying drawings without creative efforts.

DETAILED DESCRIPTION

Figure 1:
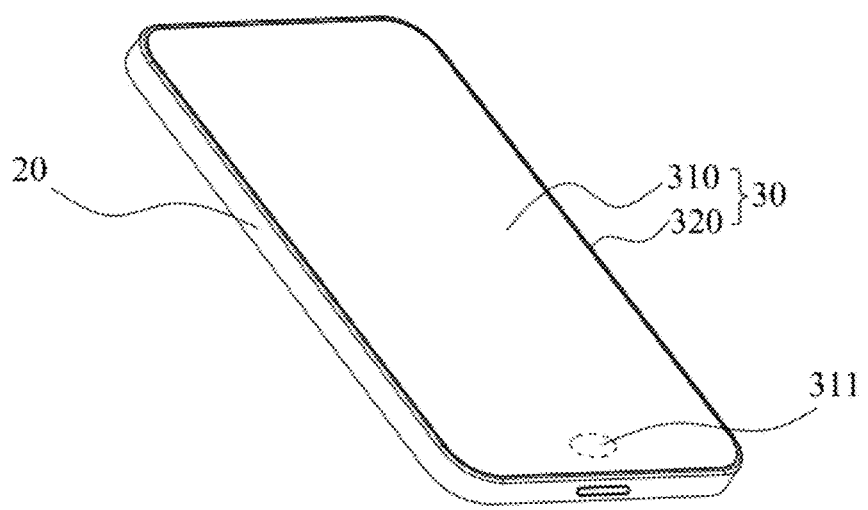
FIG. 1 is a schematic structural diagram illustrating an electronic device according to implementations.

A method for fingerprint recognition is provided. The method is applicable to an electronic device 1. The electronic device 1 may be, but is not limited to, a device having a fingerprint recognition function, such as a mobile phone or a tablet computer. FIG. 1 is a schematic structural diagram illustrating an electronic device according to implementations. The electronic device 1 includes a fingerprint sensor 10. The fingerprint sensor 10 is configured to collect a fingerprint image of a user. The fingerprint sensor 10 may be, but is not limited to, a sensor having fingerprint collection and recognition functions, such as an optical fingerprint sensor, a capacitive fingerprint sensor, or an ultrasonic fingerprint sensor. The electronic device 1 further includes a casing 20 and a display screen 30. The casing 20 defines a space for receiving a circuit board, a battery, and other components of the electronic device 1. The display screen 30 is received in the receiving space defined in the casing 20. The display screen 30 has an outer surface exposed from an opening of the casing 20. The outer surface exposed is convenient for users to watch and is also referred to as a display surface. The display screen 30 may be a component merely having a display function or a component having both display and touch functions. When the display screen 30 having both the display and touch functions, the display screen 30 can receive a user's touch operation and then perform a corresponding action in response to the touch operation. The display screen 30 may be a self-emitting panel, for example, the display screen 30 is an organic light-emitting diode panel.

The display screen 30 generally has a display region 310 and a non-display region 320. The display region 310 is used for displaying characters, pictures, videos, and the like. The non-display region 320 is generally on the periphery of the display region 310 and is generally opaque to cover metal wires in the display screen 30. The display screen 30 has a display surface away from the casing 20. The display screen 30 further has a fingerprint collecting region 311. The fingerprint sensor 10 is arranged under the fingerprint collecting region 311. When the electronic device 1 is in a fingerprint collecting mode, the fingerprint sensor 10 is configured to collect an image of a user's finger placed on the fingerprint collecting region 311 to obtain a fingerprint image of the user. Generally, the fingerprint sensor 10 is arranged on one side of the display screen 30 away from the display surface of the display screen 30. In at least one implementation, the fingerprint collecting region 311 is a part of the display region 310 or the whole display region 310. As an example, when the electronic device 1 is in a fingerprint collecting mode, the fingerprint sensor 10 is configured to collect the fingerprint image of the user through the fingerprint collecting region 311. As another example, when the electronic device 1 is in a display mode, the fingerprint collecting region 311 can be used for display. In addition, in such a case that the display screen 30 has both the display and touch functions and the fingerprint collecting region 311 is a part of the display region 310 or the whole display region 310, the fingerprint sensor 10 is configured to collect an image of a user's finger placed on the fingerprint collecting region 311 to obtain a fingerprint image of the user under a condition that the electronic device 1 is in the fingerprint collecting mode, the fingerprint collecting region 311 is used for display under a condition that the electronic device 1 is in the display mode, and the fingerprint collecting region 311 is used as a touch region for receiving a user's touch operation under a condition that the electronic device 1 is in a touch mode. It is to be understood that the fingerprint collecting region 311 is not a part of the display region 310.

Figure 2:
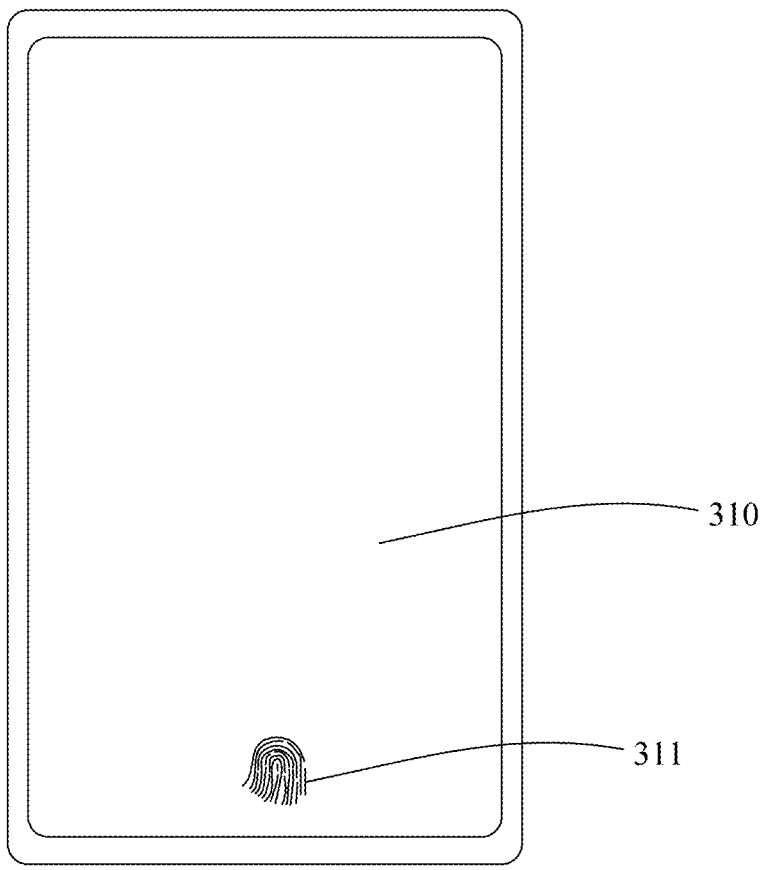
FIG. 2 is a schematic diagram illustrating an interface of an electronic device in a fingerprint collecting mode according to implementations.
Figure 3:
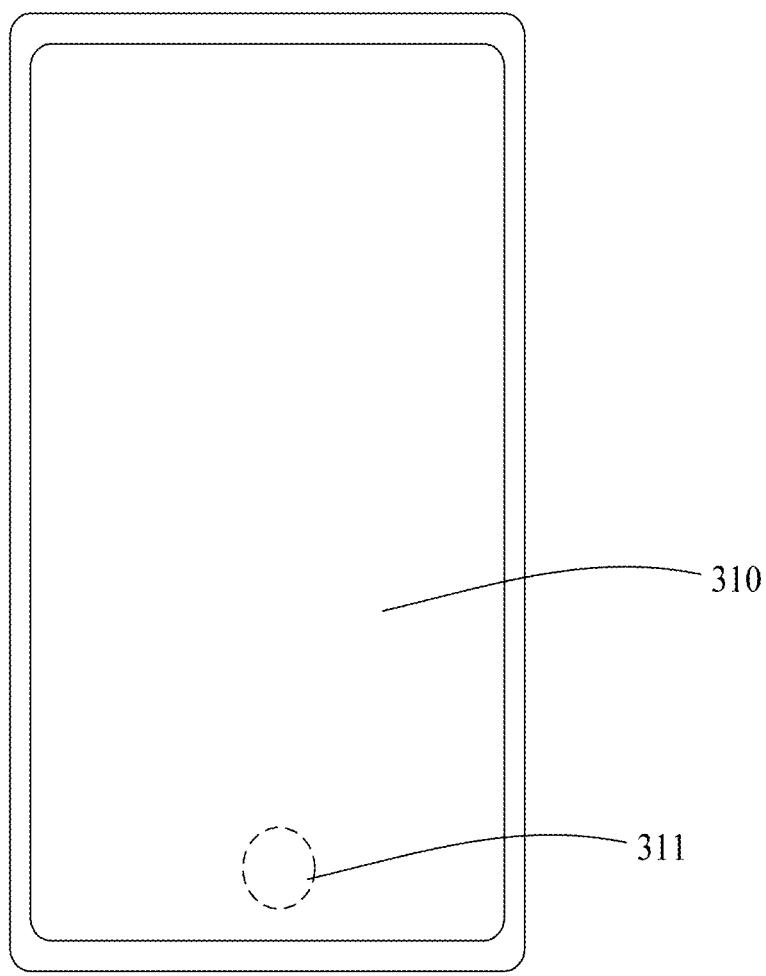
FIG. 3 is a schematic diagram illustrating an interface of an electronic device that is not in a fingerprint collecting mode according to implementations.

FIG. 2 is a schematic diagram illustrating an interface of an electronic device in a fingerprint collecting mode according to implementations, and FIG. 3 is a schematic diagram illustrating an interface of an electronic device that is not in a fingerprint collecting mode according to implementations. A part of the display region 310 being regarded as the fingerprint collecting region 311 of the electronic device 1 is taken as an example for illustration. When the electronic device 1 is in the fingerprint collecting mode, an identifier is displayed on the fingerprint collecting region 311 to indicate a position to be touched by the user's finger. The identifier may be, but is not limited to, a fingerprint pattern. When the electronic device 1 is not in the fingerprint collecting mode, the identifier disappears, so that the display screen 30 of the electronic device 1 can perform display.

Figure 4:
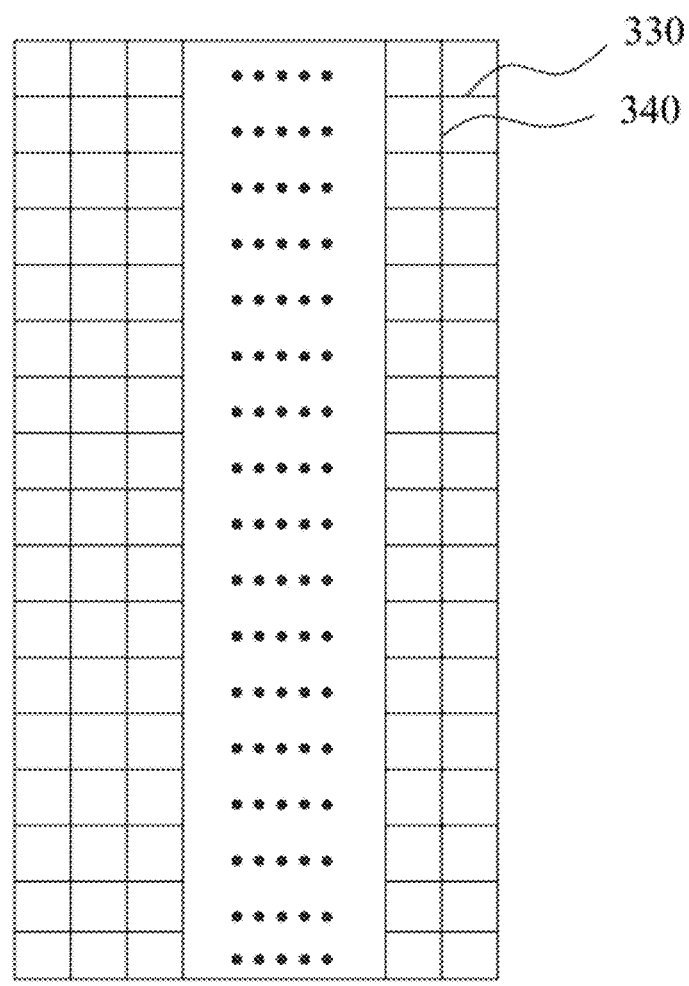
FIG. 4 is a schematic diagram illustrating a display component of an electronic device according to implementations.

FIG. 4 is a schematic diagram illustrating a display component of an electronic device according to implementations. The display region 310 includes multiple pixel regions arranged in an array. In one example, the display screen 30 includes multi-row scan lines 330 that are spaced apart from each other and multi-column data lines 340 that are spaced apart from each other. The multi-row scan lines 330 intersect the multi-column data lines 340, and the multi-row scan lines 330 and the multi-column data lines 340 are insulated from each other. A pixel region is formed among two adjacent data lines 340 and two adjacent scan lines 330 adjacent to the two adjacent data lines 340. The fingerprint collecting region 311 includes the multiple pixel regions.

Figure 5:
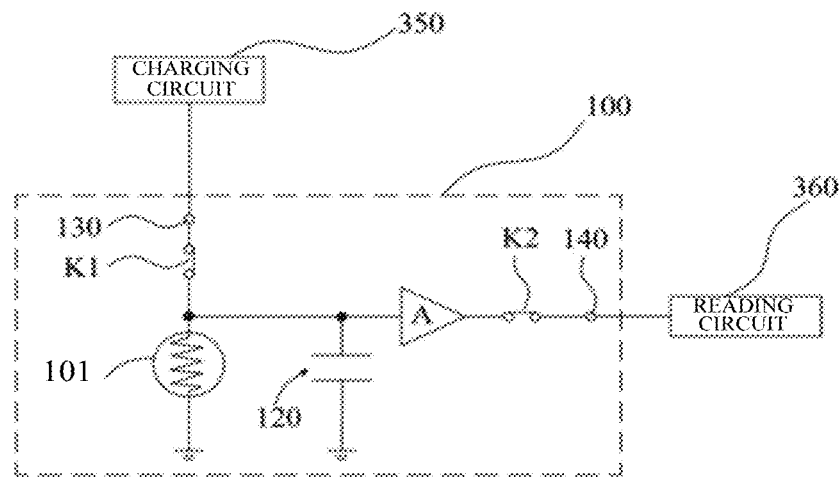
FIG. 5 is a schematic diagram illustrating a circuit structure of a fingerprint sensor of an electronic device according to implementations.

FIG. 5 is a schematic diagram illustrating a circuit structure of a fingerprint sensor of an electronic device according to implementations. The fingerprint sensor 10 includes multiple fingerprint collecting circuits 100. Generally, one fingerprint collecting circuit 100 corresponds to one pixel region in terms of position. For each single fingerprint collecting circuit 100, the fingerprint collecting circuit 100 includes a light sensing circuit 101 and a storage circuit 120. The light sensing circuit 101 corresponds to one pixel region in terms of position and is electrically coupled with the storage circuit 120. In one example, the fingerprint collecting circuits 100 correspond to at least a part of the pixel regions of the display region 310 in terms of position so that a part of or all the display region 310 can be used for fingerprint collecting. In one example, the light sensing circuit 101 is a light sensor, and the storage circuit 120 is a capacitor.

Figure 6:
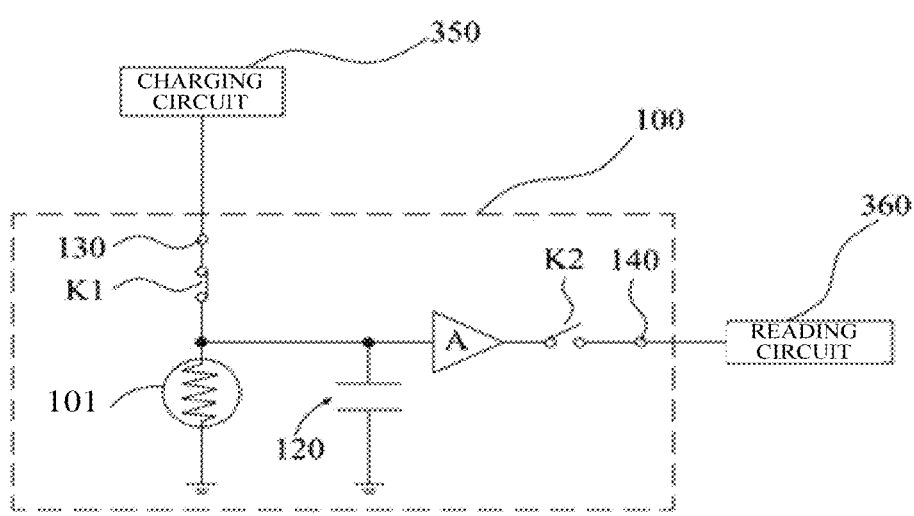
FIG. 6 is a schematic diagram illustrating a work principle of the fingerprint sensor illustrated in FIG. 5 during a reset time period.
Figure 7:
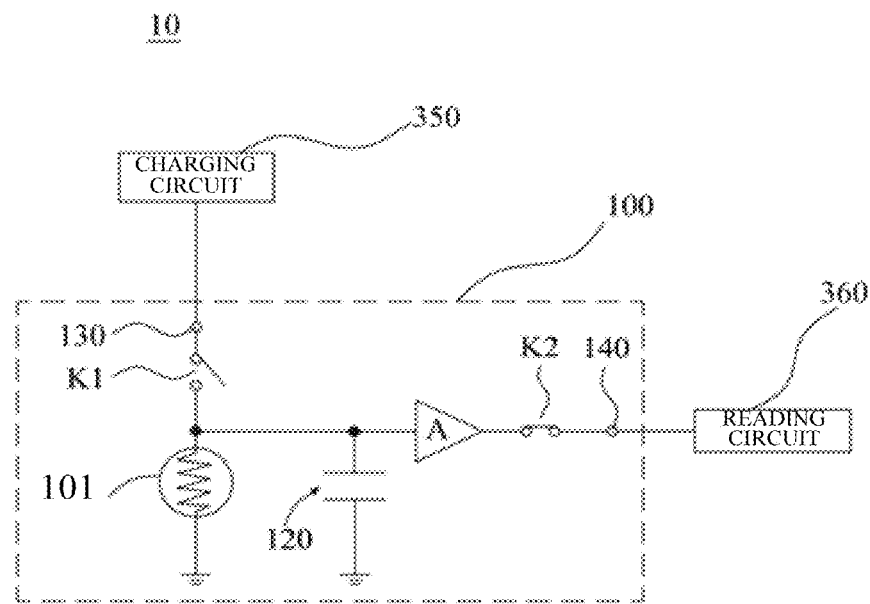
FIG. 7 is a schematic diagram illustrating a work principle of the fingerprint sensor illustrated in FIG. 5 during a sensing time period.
Figure 8:
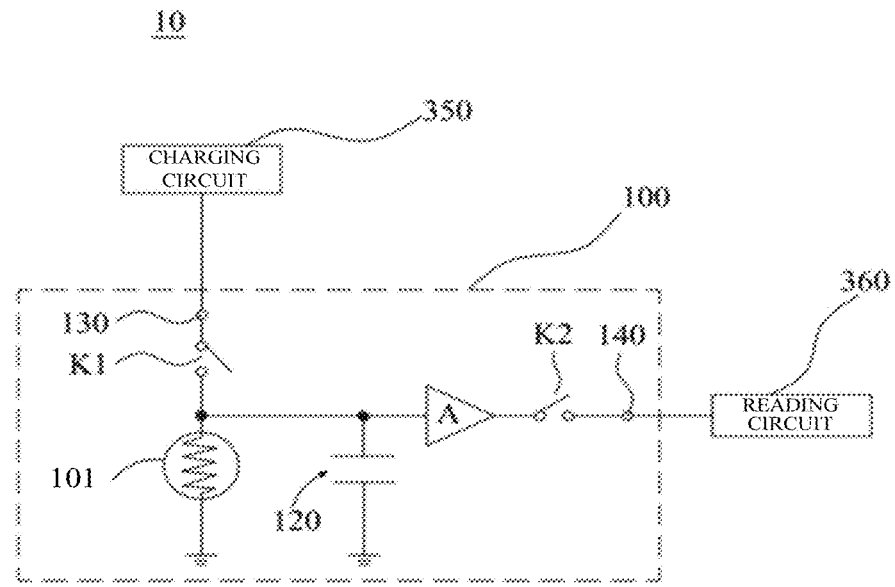
FIG. 8 is a schematic diagram illustrating a work principle of the fingerprint sensor illustrated in FIG. 5 during a reading time period.

FIG. 6 is a schematic diagram illustrating a work principle of the fingerprint sensor illustrated in FIG. 5 during a reset time period, FIG. 7 is a schematic diagram illustrating a work principle of the fingerprint sensor illustrated in FIG. 5 during a sensing time period, and FIG. 8 is a schematic diagram illustrating a work principle of the fingerprint sensor illustrated in FIG. 5 during a reading time period. During fingerprint collecting, the fingerprint collecting circuit 100 works in, but is not limited to, three consecutive time periods including the reset time period, the sensing time period, and the reading time period. In the reset time period, the storage circuit 120 receives a charging signal to store energy, so that a voltage at one end of the storage circuit 120 coupled with the light sensing circuit 101 is a first voltage. In the sensing time period after the reset time period, the light sensing circuit 101 receives an optical signal, and the storage circuit 120 and the light sensing circuit 101 form a loop. At the end of the sensing time period, a voltage across the storage circuit 120 and the light sensing circuit 101 becomes a second voltage, where the second voltage is smaller than the first voltage. The second voltage is output in the reading time period after the sensing time period.

In addition, the fingerprint collecting circuit 100 further includes a first switch K1 and a charging port 130. The first switch K1 is connected between the charging port 130 and the storage circuit 120. The charging port 130 is used for loading the charging signal. The first switch K1 is switched on in the reset time period, such that the storage circuit 120 can receive the charging signal from the charging port 130. The first switch K1 is switched off in the sensing time period and the reading time period.

In one example, the display screen 30 further includes a charging circuit 350. The charging circuit 350 is configured to transmit the charging signal to the storage circuit 120 in the reset time period. The charging circuit 350 is disposed in one pixel region, or the charging circuit 350 corresponds to the non-display region 320 in terms of position.

Furthermore, the fingerprint collecting circuit 100 further includes a second switch K2 and a reading port 140. The second switch K2 is connected between the reading port 140 and the storage circuit 120. The second switch K2 is switched on in the reading time period, such that the reading port 140 can output the second voltage. The second switch K2 is switched off in the reset time period and the sensing time period.

In one example, the display screen 30 further includes a reading circuit 360. The reading circuit 360 is configured to acquire the second voltage across the storage circuit 120 and the light sensing circuit 101 in the reading time period. The reading circuit 360 is disposed in one pixel region, or the reading circuit 360 corresponds to the non-display region 320 in terms of position.

Moreover, the fingerprint collecting circuit 100 further includes an amplifier A. The amplifier A is connected to the end of the storage circuit 120 electrically coupled with the light sensing circuit 101. The amplifier A is used for amplifying the second voltage, and correspondingly, the reading circuit 360 is configured to acquire the second voltage amplified.

Figure 9:
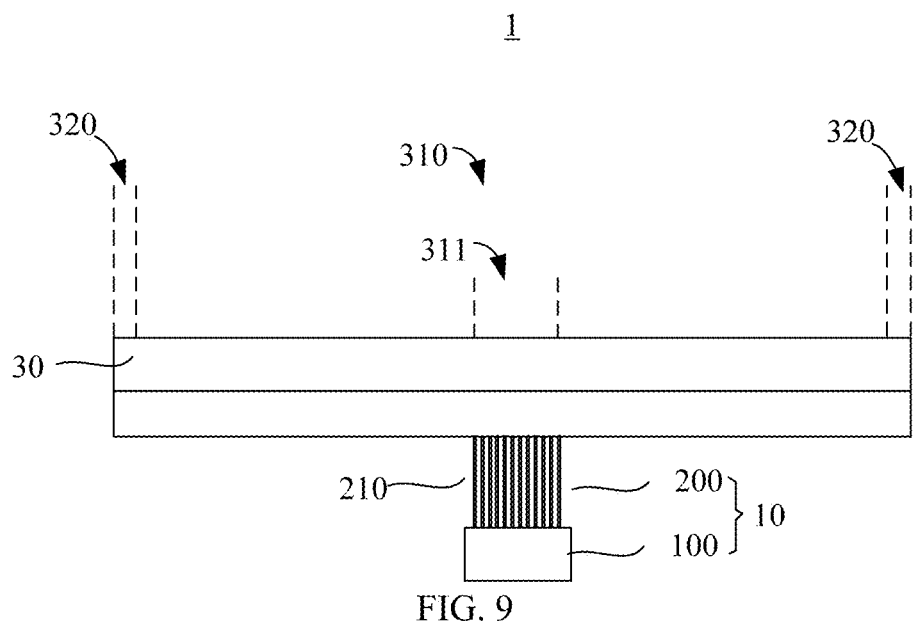
FIG. 9 is a schematic structural diagram illustrating a display screen and a fingerprint sensor of an electronic device according to implementations.

FIG. 9 is a schematic structural diagram illustrating a display screen and an optical fingerprint sensor of an electronic device according to implementations, and can be illustrated as a side view of the fingerprint sensor 10 and the display screen 30 along a short edge direction of the electronic device 1 in FIG. 1. The fingerprint sensor 10 corresponds to the fingerprint collecting region 311 in FIG. 1 in terms of position. The fingerprint sensor 10 further includes a light guide member 200 in addition to the fingerprint collecting circuits 100. The light guide member 200 is disposed between the display screen 30 and the fingerprint collecting circuits 100. The light guide member 200 is configured to direct light signals (lights) incident from the fingerprint collecting region 311 to the fingerprint collecting circuits 100, to reduce scattering of the light signals incident from the fingerprint collecting region 311, so as to improve the clarity of a fingerprint image collected by the fingerprint collecting circuits 100. Furthermore, the light guide member 200 directs the light signals incident from the fingerprint collecting region 311 to the fingerprint collecting circuits 100, and thus the crosstalk of the light signals incident from the fingerprint collecting region 311 can be reduced, thereby further improving the clarity of the fingerprint image collected by the fingerprint collecting circuits 100. The light guide member 200 includes multiple light guide pillars 210 arranged in an array. The light guide pillars 210 may be made from, but is not limited to, glass fiber. A diameter of each of the light guide pillars 210 is about 25 microns. A distance between any two adjacent light guide pillars 210 is generally 26.5 microns. The light guide pillars 210 correspond to pixel regions of the display screen 30 in terms of position. For example, one light guide pillar 210 may correspond to one pixel region, or may correspond to two or more pixel regions. With a reduction in the number of pixel regions corresponding to one single light guide pillar 210, the capability that the light guide member 200 transmits the light signals incident from the fingerprint collecting region 311 increases, scattering of the light signals incident from the fingerprint collecting region 311 to the fingerprint collecting circuit 100 reduces, the crosstalk among the light signals incident from the fingerprint collecting region 311 to the fingerprint collecting circuit 100 reduces, and the clarity of the fingerprint image collected by the fingerprint collecting circuit 100 increases. The light guide member 200 is also referred to as a collimating lens (OLENS).

Figure 10:
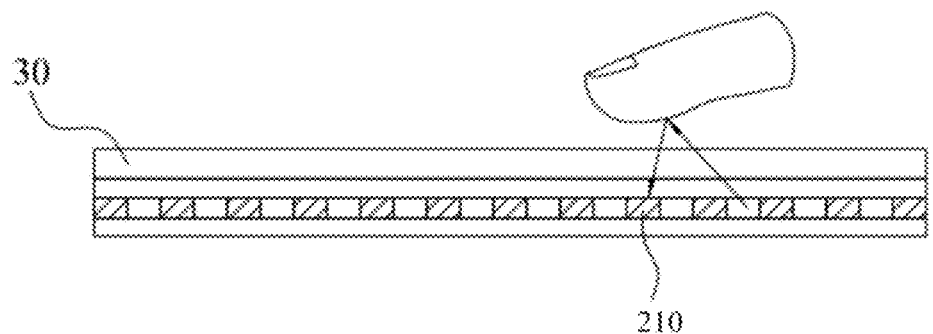
FIG. 10 is a schematic diagram illustrating a work principle of an electronic device during fingerprint recognition according to implementations.

FIG. 10 is a schematic diagram illustrating a work principle of an electronic device during fingerprint recognition according to implementations. In FIG. 10, the fingerprint collecting circuits 100 are arranged below a preset region of the display region 310. That is, the preset region is set to be the fingerprint collecting region 311. When a distance between a fingerprint surface of the user's finger and the display screen 30 is smaller than or equal to a sensing distance, a processor 40 of the electronic device 1 controls the display screen 30 where the preset region locates to emit lights to illuminate the fingerprint surface of the user's finger. The lights emitted on the preset region are reflected by the fingerprint surface of the user's finger, and reflected lights are received by the light sensing circuits 101. The sensing distance is the maximum distance within which the light sensing circuits 101 can accurately sense and receive reflected lights. The fingerprint surface of the user's finger has ridges and valleys, when the lights emitted on the preset region have a certain intensity, the ridges and valleys generate different reflection effects on the lights. When the light sensing circuit 101 receives reflected lights of different intensities, sensing currents generated by the light sensing circuit 101 may also have different magnitudes. As such, a fingerprint image of the user can be determined according to the magnitudes of the sensing currents output from the light sensing circuits corresponding to different pixel regions of the fingerprint collecting region 311 and coordinates of the light sensing circuits corresponding to different pixel regions. In addition, since the value of the second voltage has changed after the sensing time period has elapsed, the value of the sensing current accordingly changes. Therefore, the fingerprint image of the user may also be determined according to the value of the second voltage across the storage circuit 120 and the light sensing circuit 101 that correspond to each of different pixel regions of the fingerprint collecting region 311 and the coordinates of the light sensing circuits corresponding to different pixel regions after the sensing time period has elapsed.

In some scenarios in which fingerprint verification needs to be performed, for example, to unlock the electronic device 1, the following may be performed. Fingerprint images of the user are collected, and according to the fingerprint images, a standard fingerprint image is determined and stored. When fingerprint verification needs to be performed on the electronic device 1, a fingerprint image of the user is collected to obtain a fingerprint image to be verified. The fingerprint image to be verified is compared with the standard fingerprint image to determine whether a match between the fingerprint image to be verified and the standard fingerprint image exists. When the fingerprint image to be verified matches the standard fingerprint image, the fingerprint verification succeeds, otherwise, the fingerprint verification fails. However, during collection of the fingerprint image, when there is a foreign material between the user's finger and the fingerprint sensor 10 (for example, in the display screen 30 or between the fingerprint sensor 10 and the display screen 30), an image of the foreign material (that is, foreign material image) may be collected. In other words, the standard fingerprint image may contain the foreign material image. Similarly, the collected fingerprint image to be verified may also contain the foreign material image. In this case, when the fingerprint image to be verified is compared with the standard fingerprint image, due to the presence of the foreign material image, a probability that the fingerprint image to be verified matches the standard fingerprint image increases. In addition, even if the fingerprint image to be verified does not match the standard fingerprint image actually, due to the presence of the foreign material image, a phenomenon that the fingerprint image to be verified matches the standard fingerprint image may occur. As can be seen, the presence of the foreign material may affect normal fingerprint verification.

Figure 11:
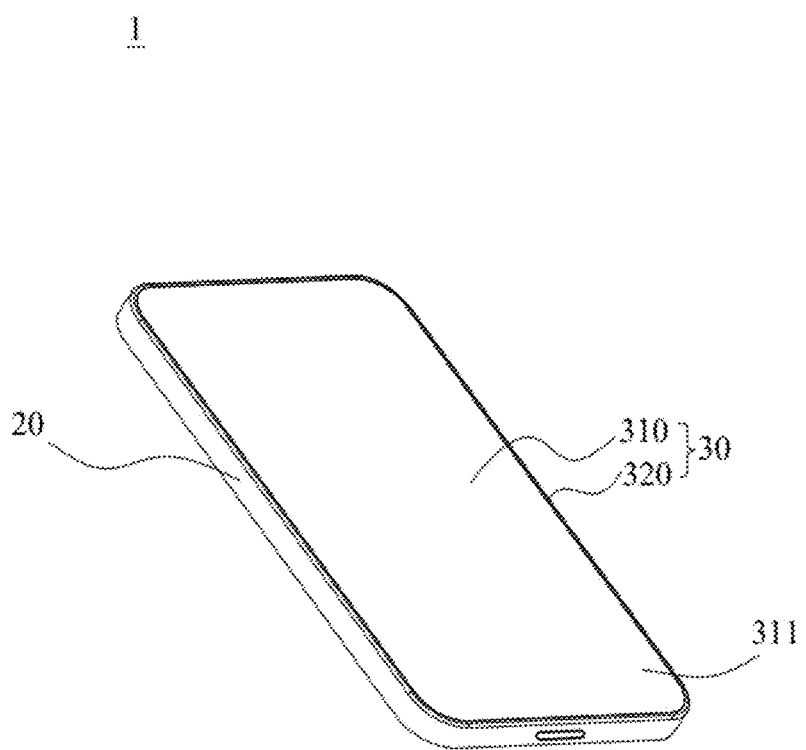
FIG. 11 is a schematic structural diagram illustrating an electronic device according to other implementations.
Figure 12:
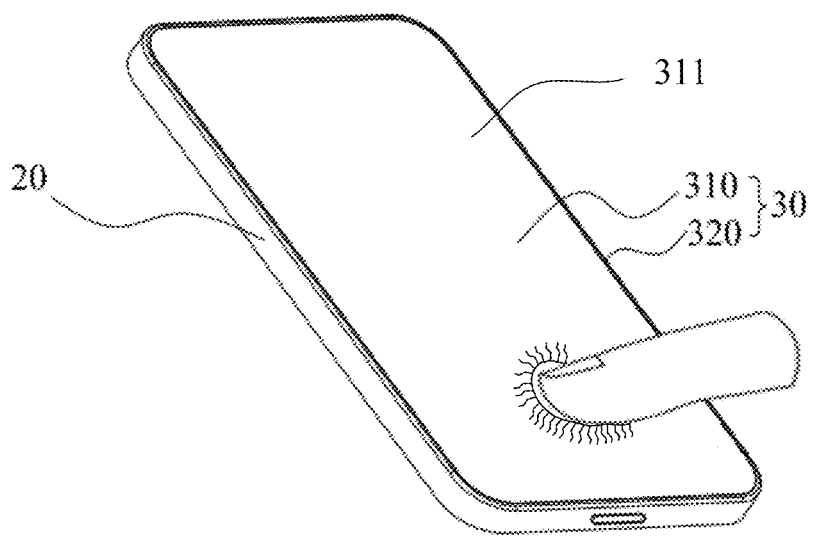
FIG. 12 is a schematic diagram illustrating of an interface of an electronic device in a fingerprint collecting mode when fingerprint collection is performed according to other implementations.
Figure 13:
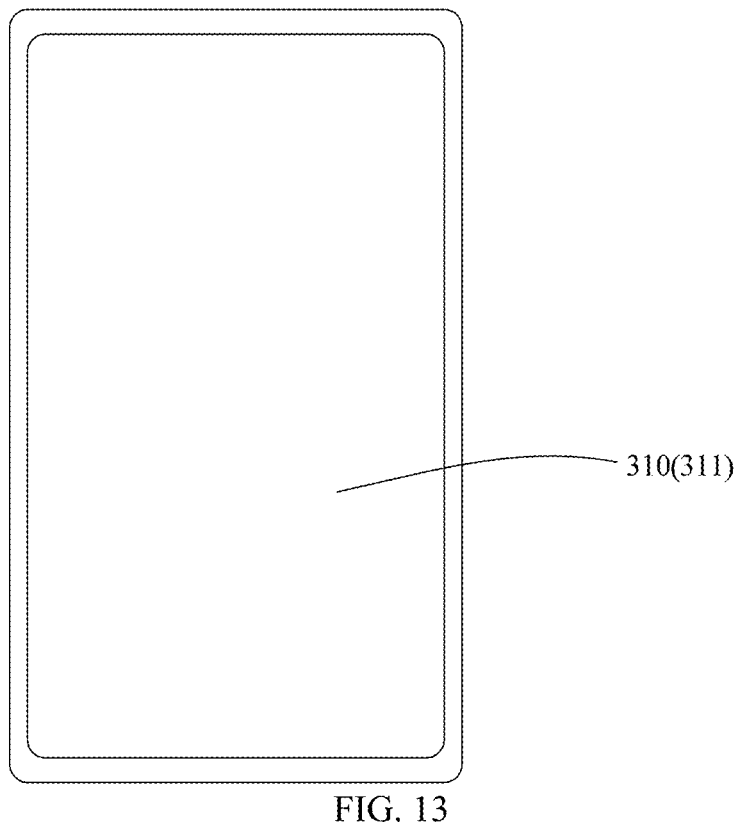
FIG. 13 is a schematic diagram illustrating an interface of an electronic device that is not in a fingerprint collecting mode according to other implementations.

In the foregoing implementations, a part of the display region 310 being regarded as the fingerprint collecting region 311 is taken as an example for illustration. In some implementations, the fingerprint collecting region 311 is the whole display region 310. FIG. 11 is a schematic structural diagram illustrating an electronic device according to other implementations, FIG. 12 is a schematic diagram illustrating an interface of an electronic device in a fingerprint collecting mode when fingerprint collection is performed according to other implementations, and FIG. 13 is a schematic diagram illustrating an interface of an electronic device that is not in a fingerprint collecting mode according to other implementations. In the implementations, the whole display region 310 of the electronic device 1 is implemented as the fingerprint collecting region 311, that is, the electronic device 1 has a full-screen fingerprint recognition function. When the electronic device 1 is in the fingerprint collecting mode, since the fingerprint collecting region 311 of the electronic device 1 is the whole display region 310, the user can place his finger on any position of the display region 310. When a distance between the user's finger and the display screen 30 is less than or equal to a preset distance d (such as, 5 mm), the fingerprint sensor 30 collects an image of the user's finger to obtain a fingerprint image. In one example, when the electronic device 1 is in the fingerprint collecting mode, the user can place his finger on any position of the display region 310, and when the distance between the user's finger and the display screen 30 is less than or equal to the preset distance d, a preset pattern displays at the position of the display region 310 corresponding to the finger to inform the user of that the fingerprint collection is performing. When the electronic device 1 is not in the fingerprint collecting mode, the preset pattern disappears, such that the display screen 30 of the electronic device 1 can be used for display.

Figure 14:
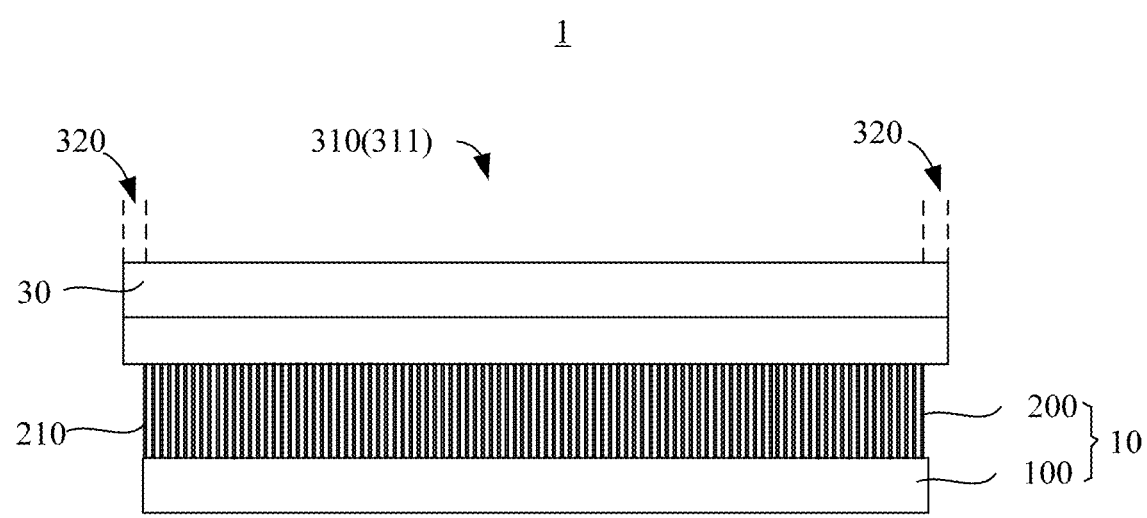
FIG. 14 is a schematic structural diagram illustrating a display screen and a fingerprint sensor of an electronic device according to other implementations.

FIG. 14 is a schematic structural diagram illustrating a display screen and a fingerprint sensor of an electronic device according to other implementations, and can be illustrated as a side view of the fingerprint sensor 10 and the display screen 30 along a short edge direction of the electronic device 1 in FIG. 11. The fingerprint sensor 10 corresponds to the fingerprint collecting region 311 in FIG. 11 in terms of position. Since the fingerprint collecting region 311 is the whole display region 310, the fingerprint sensor 10 is disposed below the whole display region 310 of the display screen 30. The fingerprint sensor 10 includes multiple fingerprint collecting circuits 100 and a light guide member 200. Generally, one fingerprint collecting circuit 100 corresponds to one pixel region in terms of position. For the structure of the fingerprint collecting circuit 100, reference may be made to the foregoing description and details are not described herein again. In FIG. 14, the fingerprint collecting circuits 100 are disposed below all pixel regions of the display region 310 so that the whole display region 310 can be used for fingerprint collecting.

The foregoing implementations describe the optical fingerprint sensor as an example of the fingerprint sensor 10. In one example, the fingerprint sensor 10 may be a capacitive fingerprint sensor or an ultrasonic fingerprint sensor. There is no restriction on the type of the fingerprint sensor 10. As long as the fingerprint collecting region 311 of the electronic device 1 is the part of the display region 310 or the whole display region 310, the fingerprint sensor may be considered to meet the requirements.

Figure 15:
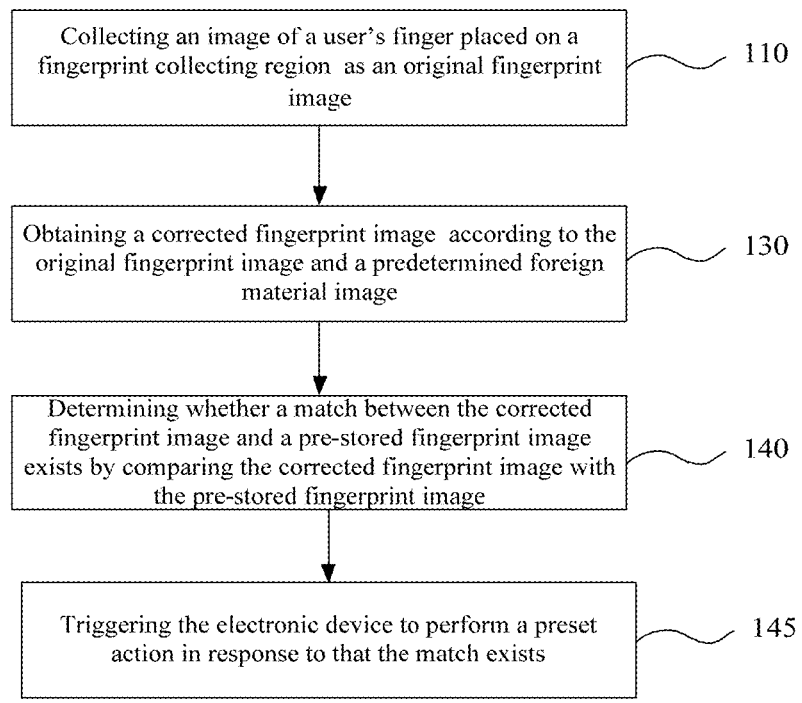
FIG. 15 is a schematic flow chart illustrating a method for fingerprint recognition according to implementations.

The method for fingerprint recognition will be described below in conjunction with the electronic device 1 described above. FIG. 15 is a schematic flow chart illustrating a method for fingerprint recognition according to implementations. The method includes, but is not limited to, operations at block 110, block 130, block 140, and block 145. The operations at block 110, block 130, block 140, and block 145 are described in detail below.

At block 110, an image of a user's finger placed on the fingerprint collecting region is collected as an original fingerprint image.

At block 130, a corrected fingerprint image is obtained according to the original fingerprint image and a predetermined foreign material image, where the predetermined foreign material image is obtained when the user's finger is not placed on the fingerprint collecting region and indicative of a foreign material on the fingerprint collecting region.

At block 140, determine whether a match between the corrected fingerprint image and a pre-stored fingerprint image exists by comparing the corrected fingerprint image with the pre-stored fingerprint image.

At block 145, the electronic device is triggered to perform a preset action in response to that the match exists.

In one example, the method may further include an operation at block 120. The operation at block 120 can be performed between the operations at block 110 and block 130, or can be performed before the operation at block 110. The operation at block 120 is described in detail below. At block 120, determine existence of a foreign material on the fingerprint collecting region 311 of the electronic device 1. The foreign material generally includes hair, a metal wire, a conductive pen, insulating glue and so on, and correspondingly, a foreign material image is an image formed by sensing the foreign material with the fingerprint sensor 10 of the electronic device 1. In one example, if the display screen 30 where the fingerprint collecting region 311 locates is broken and has a crack, when lights are incident from the fingerprint collecting region 311 to the fingerprint sensor 10, a foreign material image may be generated. In this case, the crack of the display screen 30 is considered as a foreign material. When there is a foreign material on the fingerprint collecting region 311 of the electronic device 1, the method proceeds to block 130. Otherwise, the original fingerprint image is compared with the pre-stored fingerprint image to determine whether a match between the original fingerprint image and the pre-stored fingerprint image exists.

Figure 16:
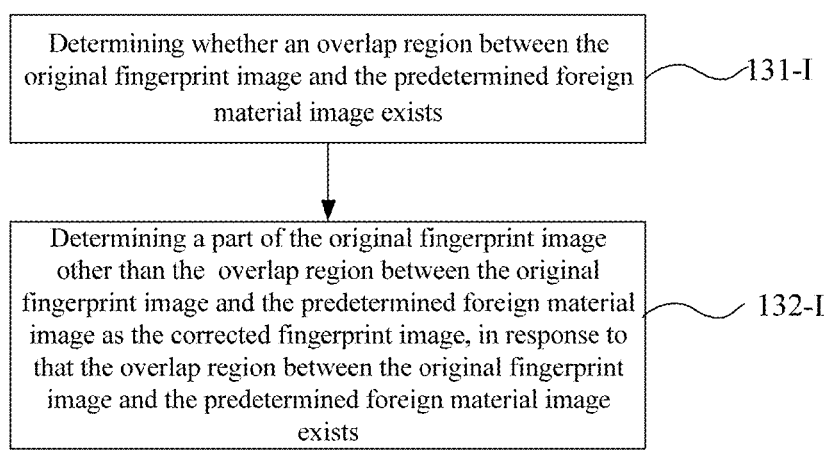
FIG. 16 is a schematic flow chart illustrating an operation at block 130 in the method for fingerprint recognition according to implementations.

In at least one implementation, the corrected fingerprint image is obtained according to the original fingerprint image and the predetermined foreign material image of the foreign material on the region corresponding to the original fingerprint image as follows (operations at block 131-I and block 132-I). FIG. 16 is a schematic flow chart illustrating an operation at block 130 in the method for fingerprint recognition according to implementations.

At block 131-I, determine whether an overlap region between the original fingerprint image and the predetermined foreign material image exists.

At block 132-I, a part of the original fingerprint image other than the overlap region between the original fingerprint image and the predetermined foreign material image is determined as the corrected fingerprint image, in response to that the overlap region between the original fingerprint image and the predetermined foreign material image exists.

In some implementations, when the overlap region between the original fingerprint image and the predetermined foreign material image exists, the part of the original fingerprint image other than the overlap region between the original fingerprint image and the predetermined foreign material image is determined as the corrected fingerprint image. In other words, when fingerprint comparison is performed, only the part of the original fingerprint image other than the overlap region is compared with the pre-stored fingerprint image. Since the foreign material image corresponding to the overlap region has a small area, removing the overlap region has a little impact on the accuracy of fingerprint comparison and can eliminate the phenomenon that the original fingerprint image that does not match the pre-stored fingerprint image when the foreign material is absent matches the pre-stored fingerprint image due to the presence of the foreign material.

In one example, the operation at block 130 includes an operation at block 133-I in addition to operations at block 131-I and block 132-I.

At block 131-I, determine whether an overlap region between the original fingerprint image and the predetermined foreign material image exists. When the overlap region between the original fingerprint image and the predetermined foreign material image exists, the method proceeds to block 132-I; otherwise, proceeds to block 133-I.

At block 132-I, a part of the original fingerprint image other than the overlap region between the original fingerprint image and the predetermined foreign material image is determined as the corrected fingerprint image, in response to that the overlap region between the original fingerprint image and the predetermined foreign material image exists.

At 5133-I, the original fingerprint image is determined as the corrected fingerprint image when the overlap region between the original fingerprint image and the predetermined foreign material image does not exist. That is, the original fingerprint image is the corrected fingerprint image.

Figure 17:
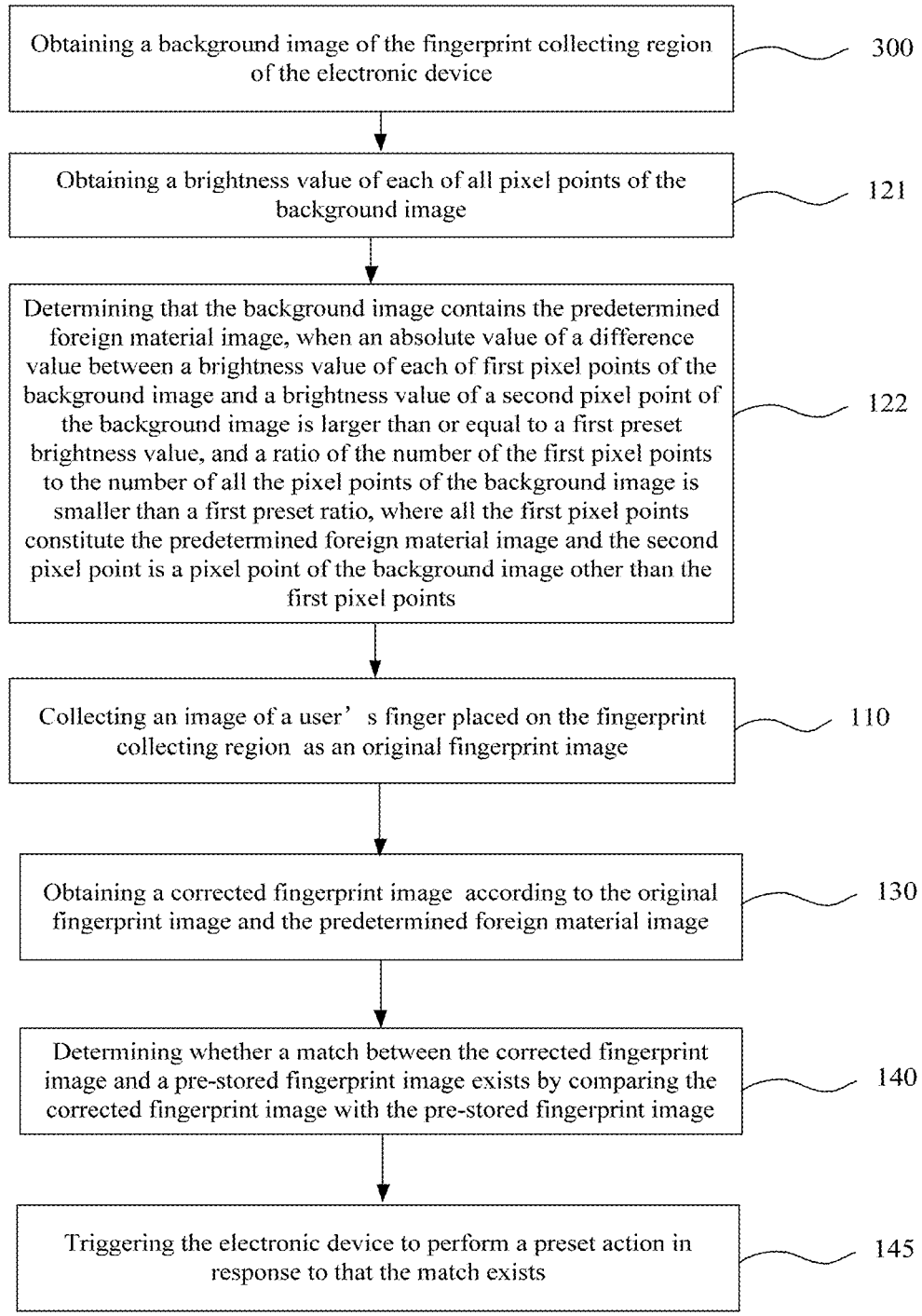
FIG. 17 is a schematic flowchart illustrating a method for fingerprint recognition according to other implementations.

In one example, prior to block 130 (that is, prior to obtaining a corrected fingerprint image according to the original fingerprint image and a predetermined foreign material image of a foreign material on a region corresponding to the original fingerprint image), the method further includes an operation at block 300. As an example, the operation at block 300 is performed between the operations at block 110 and block 130. As another example, the operation at block 300 is performed prior to the operation at block 110. As yet another example, the operations at block 300 and block 110 can be performed simultaneously, as long as the operation at block 300 is performed before the operation at block 130. FIG. 17 is a schematic flow chart illustrating a method for fingerprint recognition according to other implementations. In FIG. 17, the method begins at block 300.

At block 300, a background image of the fingerprint collecting region of the electronic device is obtained.

At block 121, a brightness value of each of all pixel points of the background image is obtained.

At block 122, determine that the background image contains the predetermined foreign material image, when an absolute value of a difference value between a brightness value of each of first pixel points of the background image and a brightness value of a second pixel point of the background image is larger than or equal to a first preset brightness value, and a ratio of the number of the first pixel points to the number of all the pixel points of the background image is smaller than a first preset ratio, where all the first pixel points constitute the predetermined foreign material image and the second pixel point is a pixel point of the background image other than the first pixel points.

In the implementations, upon determining that the background image contains the predetermined foreign material image, the predetermined foreign material image is stored in the electronic device 1.

For example, a ratio of a brightness value of a first pixel point to a brightness value of the second pixel point may be 6%. The first preset brightness value may be, but is not limited to, 300, and the first preset ratio may be, but is not limited to, 2%.

Figure 18:
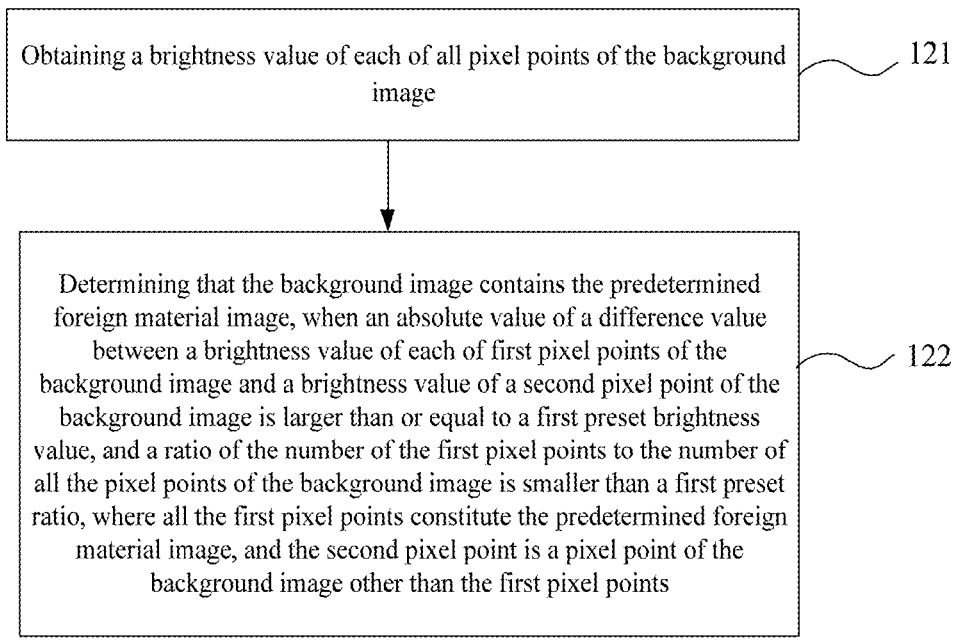
FIG. 18 is a schematic flow chart illustrating an operation at block 120 when the method for fingerprint recognition includes block 120.

When the method includes an operation at block 120, the operation at block 120 includes operations at block 121 and block 122. FIG. 18 is a schematic flow chart illustrating an operation at block 120 when the method for fingerprint recognition includes the operation at block 120.

When the foreign material is hair or a conductive pen, the foreign material image is darker than other parts of the background image. When the foreign material is a metal wire or a crack on the display screen 30, the foreign material image is brighter than other parts of the background image. In terms of determining existence of a foreign material, it is necessary to compare brightness values of all pixel points of the background image. In addition, the foreign material generally has a small size, and thus a ratio of an area of the foreign material image to an area of the whole background image is relatively small. As such, whether the foreign material exists is determined according to the ratio of the area of the foreign material image to the area of the whole background image.

In one example, when the absolute value of the difference value between the brightness value of each of the first pixel points of the background image and the brightness value of the second pixel point of the background image is larger than or equal to the first preset brightness value and the ratio of the number of the first pixel points to the number of all the pixel points of the background image is larger than or equal to the first preset ratio, remind the user to clean the display screen 30 where the fingerprint collecting region 311 locates.

When the absolute value of the difference value between the brightness value of each of the first pixel points of the background image and the brightness value of the second pixel point of the background image is larger than or equal to the first preset brightness value and the ratio of the number of the first pixel points to the number of all the pixel points of the background image is larger than or equal to the first preset ratio, there may be a stain on the display screen 30 where the fingerprint collecting region 311 locates.

Figure 19A:
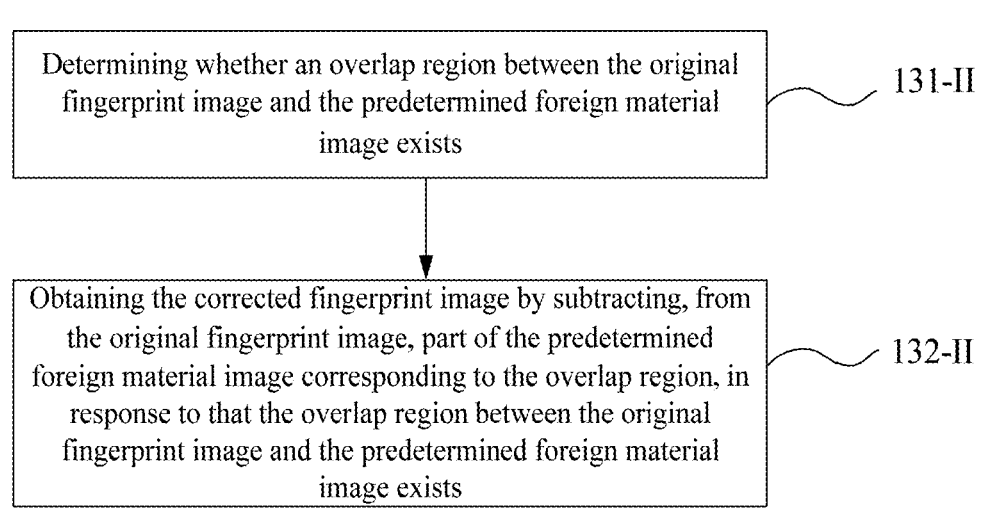
FIG. 19A is a schematic flow chart illustrating an operation at block 130 in the method for fingerprint recognition according to other implementations.

In at least one implementation, the corrected fingerprint image is obtained according to the original fingerprint image and the predetermined foreign material image of the foreign material on the region corresponding to the original fingerprint image as follows (operations at block 131-II and block 132-II). FIG. 19A is a schematic flowchart illustrating an operation at block 130 in the method for fingerprint recognition according to other implementations.

At block 131-II, determine whether an overlap region between the original fingerprint image and the predetermined foreign material image exists.

At block 132-II, the corrected fingerprint image is obtained by subtracting, from the original fingerprint image, part of the predetermined foreign material image corresponding to the overlap region, in response to that the overlap region between the original fingerprint image and the predetermined foreign material image exists.

Figure 19B:
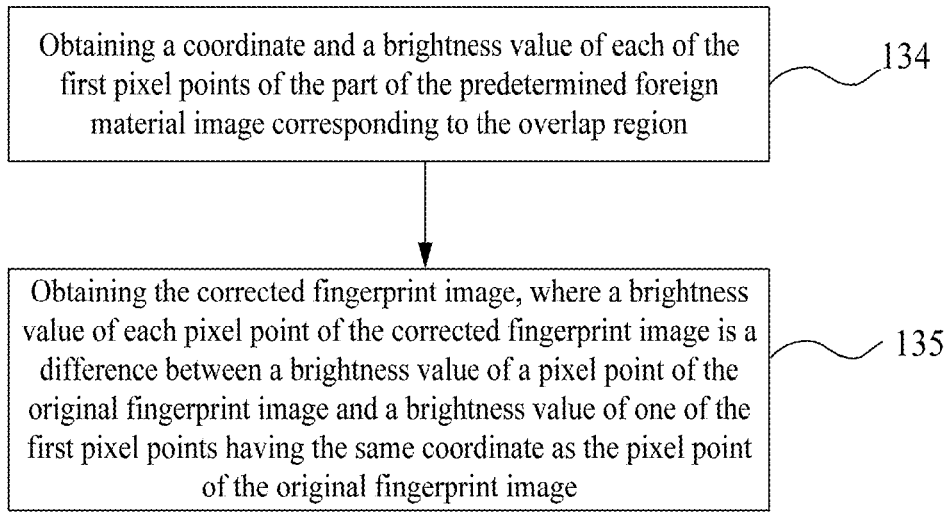
FIG. 19B is a schematic flow chart illustrating an operation at block 132-II in the method illustrated in FIG. 19A.

In at least one implementation, the corrected fingerprint image is obtained by subtracting, from the original fingerprint image, the part of the predetermined foreign material image corresponding to the overlap region as follows, that is, operations at block 134 and 135. FIG. 19B is a schematic flow chart illustrating an operation at block 132-II in the method illustrated in FIG. 19A.

At block 134, obtain a coordinate and a brightness value of each of the first pixel points of the part of the predetermined foreign material image corresponding to the overlap region.

At block 135, the corrected fingerprint image is obtained, where a brightness value of each pixel point of the corrected fingerprint image is a difference between a brightness value of a pixel point of the original fingerprint image and a brightness value of one of the first pixel points having the same coordinate as the pixel point of the original fingerprint image.

In this way, it is possible to improve the accuracy of a comparison between the corrected fingerprint image and the pre-stored fingerprint image.

Figure 20:
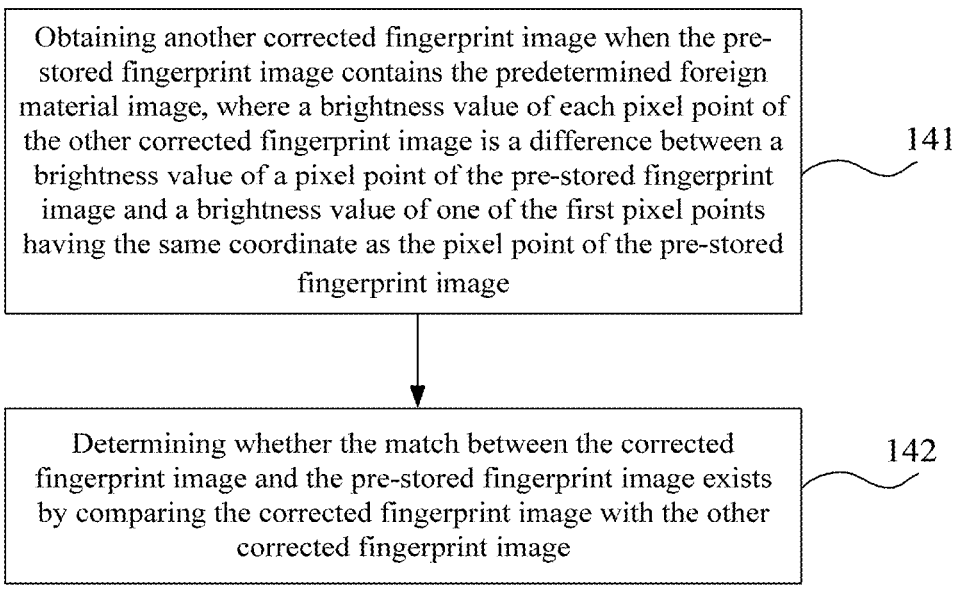
FIG. 20 is a schematic flow chart illustrating an operation at block 140 in the method for fingerprint recognition according to implementations.

In at least one implementation, determine whether the match between the corrected fingerprint image and the pre-stored fingerprint image exists by comparing the corrected fingerprint image with the pre-stored fingerprint image as follows (operations at block 141 and block 142). The operations at block 141 and block 142 are described in detail below. FIG. 20 is a schematic flow chart illustrating an operation at block 140 in the method for fingerprint recognition according to implementations.

At block 141, when the pre-stored fingerprint image contains the predetermined foreign material image, another corrected fingerprint image is obtained, where a brightness value of each pixel point of the other corrected fingerprint image is a difference between a brightness value of a pixel point of the pre-stored fingerprint image and a brightness value of one of the first pixel points having the same coordinate as the pixel point of the pre-stored fingerprint image.

At block 142, determine whether the match between the corrected fingerprint image and the pre-stored fingerprint image exists by comparing the corrected fingerprint image with the other corrected fingerprint image.

As can be seen, when the pre-stored fingerprint image contains the foreign material image, the pre-stored fingerprint image is corrected to improve the accuracy of fingerprint recognition.

In at least one implementation, the background image of the fingerprint collecting region 311 of the electronic device 1 is obtained as follows, that is, the operation at block 300 includes the following: when the electronic device 1 is in black-screen status, an image formed by ambient lights passing through the fingerprint collecting region 311 of the electronic device 1 is collected to obtain the background image.

"Black-screen status of the electronic device 1" refers to that the display screen 30 of the electronic device 1 is off. When the electronic device 1 is in the black-screen status, the display screen 30 of the electronic device 1 cannot perform display. Therefore, it is possible to avoid interference generated by content displayed on the display screen 30 of the electronic device 1.

Figure 21A:
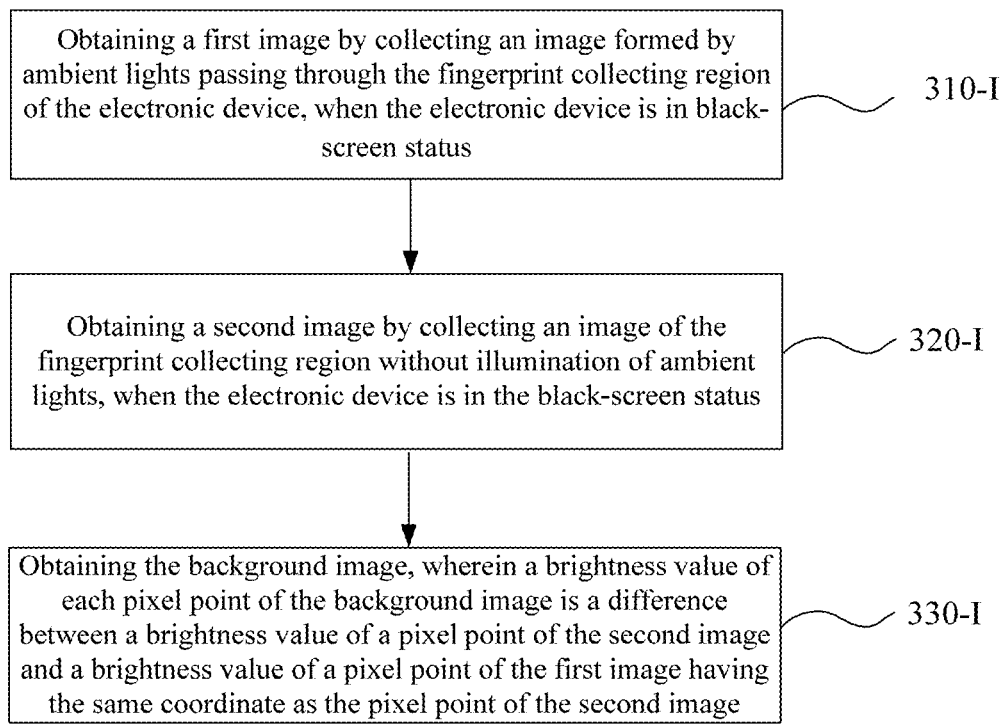
FIG. 21A is a schematic flow chart illustrating an operation at block 300 in the method for fingerprint recognition according to implementations.

In one example, the background image of the fingerprint collecting region 311 of the electronic device 1 is obtained as follows (operations at block 310-I, block 320-I, and block 330-I). The operations at block 310-I, block 320-I, and block 330-I are described in detail below. FIG. 21A is a schematic flowchart illustrating an operation at block 300 in the method for fingerprint recognition according to implementations.

At block 310-I, when the electronic device 1 is in the black-screen status, an image formed by ambient lights passing through the fingerprint collecting region 311 of the electronic device 1 is collected to obtain a first image.

At block 320-I, when the electronic device 1 is in the black-screen status, an image of the fingerprint collecting region 311 without illumination of ambient lights is collected to obtain a second image.

In one example, the fingerprint collecting region 311 of the electronic device 1 may be covered by a black box so that ambient lights cannot pass through the fingerprint collecting region 311 to enter the fingerprint sensor 10. As an example, when the fingerprint collecting region 311 is a part of the display region 310, the black box may only cover the part of the display region 310 (fingerprint collecting region 311). As another example, the black box may cover the whole display region 310 of the electronic device 1, so as to prevent lights from other parts of the display region 310 from reaching the fingerprint collecting region 311. Since the second image is obtained when the electronic device 1 is in the black-screen status and no ambient lights pass through the fingerprint collecting region 311, the second image is a noise image of the display screen 30 where the fingerprint collecting region 311 locates.

At block 330-I, the background image is obtained, where a brightness value of each pixel point of the background image is a difference between a brightness value of a pixel point of the second image and a brightness value of a pixel point of the first image having the same coordinate as the pixel point of the second image.

Figure 22:
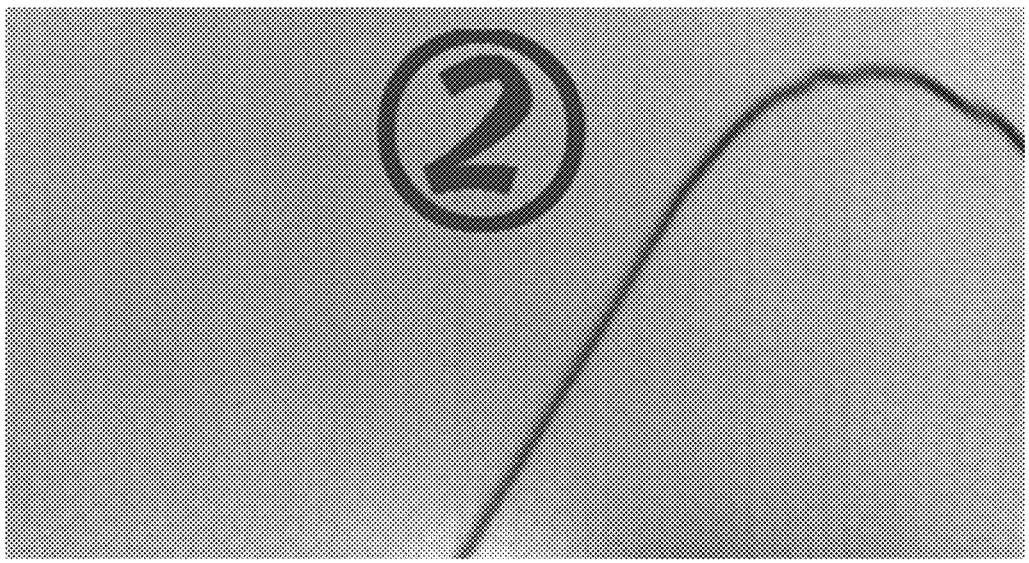
FIG. 22 is a schematic diagram illustrating a first image.
Figure 23:
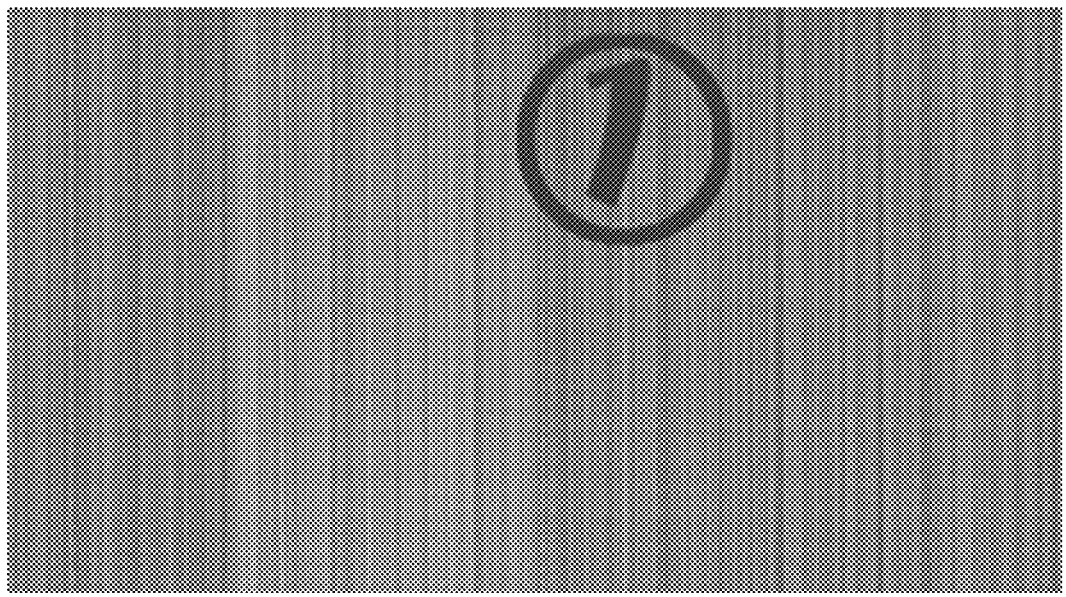
FIG. 23 is a schematic diagram illustrating a second image.
Figure 24:
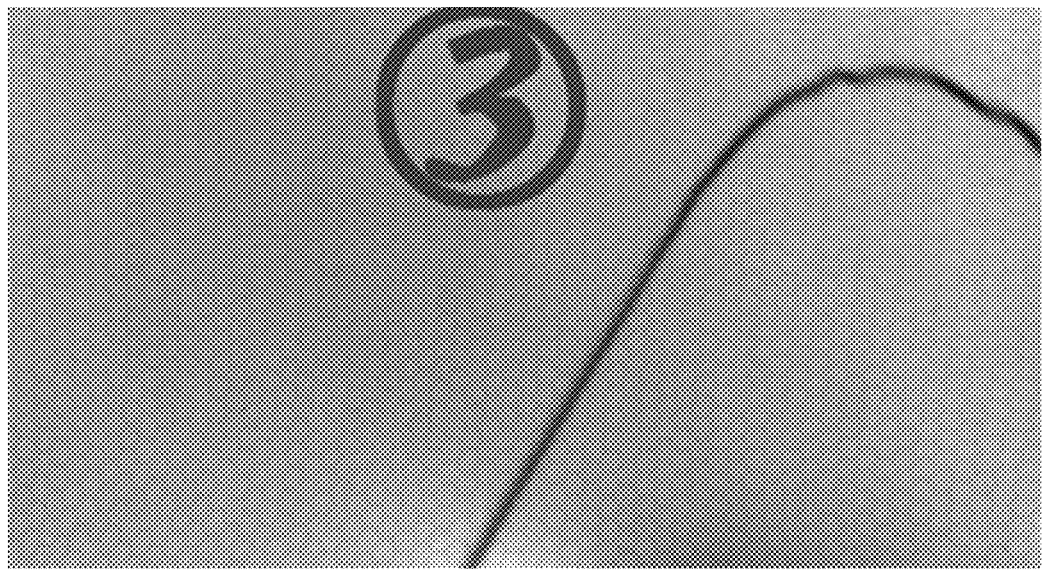
FIG. 24 is a schematic diagram illustrating a background image.

FIG. 22 is a schematic diagram illustrating a first image, FIG. 23 is a schematic diagram illustrating a second image, and FIG. 24 is a schematic diagram illustrating a background image. Since the noise of the display screen 30 is removed when the background image is obtained, the background image obtained is relatively accurate, and according to the background image whether there is a foreign material on the fingerprint collecting region 311 of the electronic device 1 can be accurately determined.

Figure 21B:
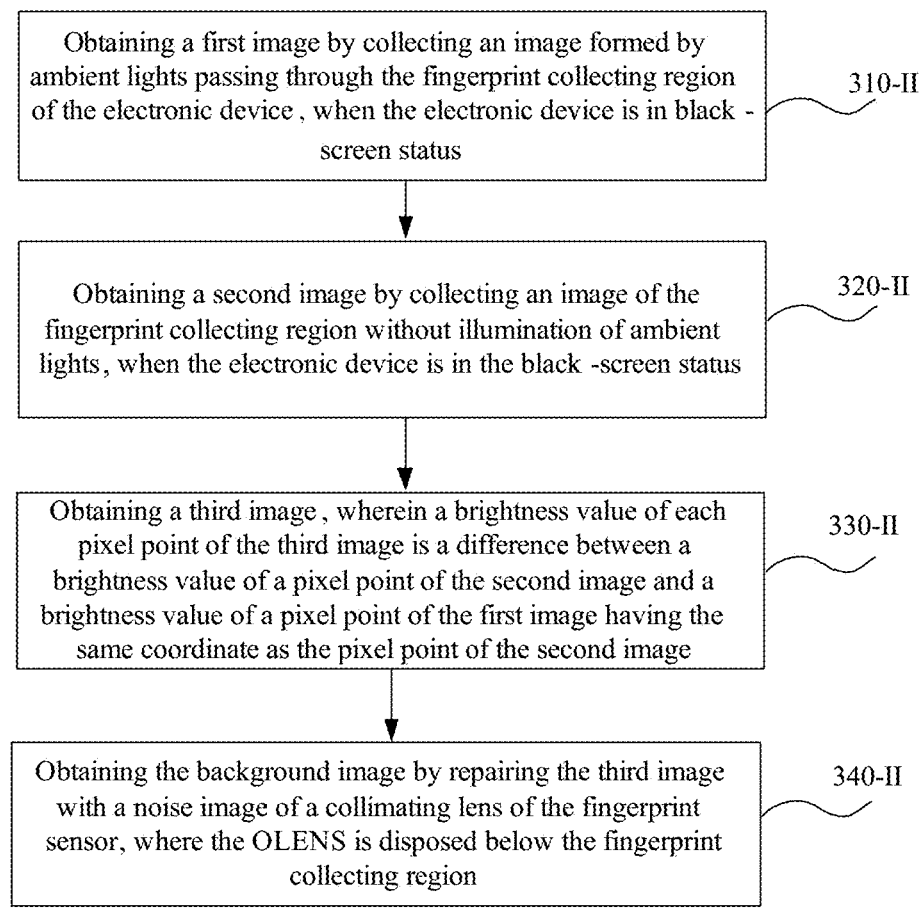
FIG. 21B is a schematic flow chart illustrating an operation at block 300 in the method for fingerprint recognition according to other implementations.

In one example, the background image of the fingerprint collecting region 311 of the electronic device 1 is obtained as follows (operations at block 310-II, block 320-II, block 330-II, and block 340-II). The operations at block 310-II, block 320-II, block 330-II, and block 340-II are described in detail below. FIG. 21B is a schematic flow chart illustrating an operation at block 300 in the method for fingerprint recognition according to other implementations.

At block 310-II, when the electronic device 1 is in the black-screen status, an image formed by ambient lights passing through the fingerprint collecting region 311 of the electronic device 1 is collected to obtain a first image.

At block 320-II, when the electronic device 1 is in the black-screen status, an image of the fingerprint collecting region 311 without illumination of ambient lights is collected to obtain a second image.

At block 330-II, a third image is obtained, where a brightness value of each pixel point of the third image is a difference between a brightness value of a pixel point of the second image and a brightness value of a pixel point of the first image having the same coordinate as the pixel point of the second image.

At block 340-II, the background image is obtained by repairing the third image with a noise image of a collimating lens (OLENS) of the fingerprint sensor, where the OLENS is disposed below the fingerprint collecting region 311.

Figure 25:
FIG. 25 is a schematic diagram illustrating a third image.
Figure 26:
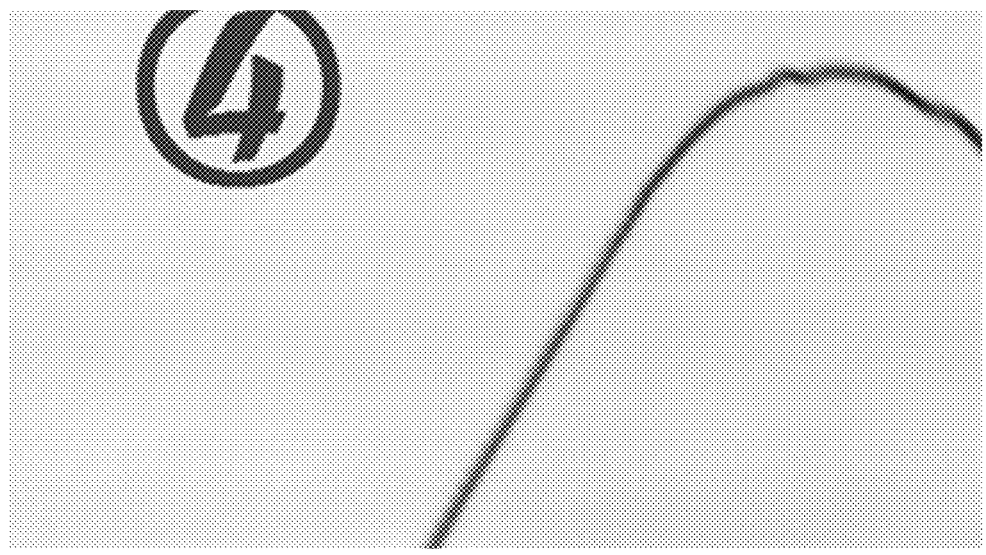
FIG. 26 is a schematic diagram illustrating a background image.

FIG. 22, FIG. 23, FIG. 25, and FIG. 26 are referred. FIG. 25 is a schematic diagram illustrating a third image, and FIG. 26 is a schematic diagram illustrating a background image. In FIG. 25, the honeycomb pattern is a noise image of the OLENS of the fingerprint sensor 1, where the OLENS is disposed below the fingerprint collecting region 311. Since the light guide pillars 210 in the light guide member 200 (also known as OLENS) and a space between any adjacent light guide pillars 210 have different transmittances, when ambient lights pass through the light guide pillars 210 of the light guide member 200 corresponding to the fingerprint collecting region 311, the honeycomb pattern is formed. As can be seen, to obtain background image, the noise of the display screen 30 and the noise of the light guide member 200 corresponding to the fingerprint collecting region 311 of the display screen 30 are removed, such that the obtained background image is relatively accurate, and according to the background image whether there is a foreign material on the fingerprint collecting region 311 of the electronic device 1 can be accurately determined.

In one example, determine whether a match between the corrected fingerprint image and a pre-stored fingerprint image exists by comparing the corrected fingerprint image with the pre-stored fingerprint image as follows, that is, the operation at block 140 includes the following. Feature points of the corrected fingerprint image are extracted and compared with target feature points of the pre-stored fingerprint image. When a ratio of the number of extracted feature points of the corrected fingerprint image that match the target feature points of the pre-stored fingerprint image to the number of all the extracted feature points is larger than or equal to a threshold ratio, it indicates that the corrected fingerprint image matches the pre-stored fingerprint image, otherwise, it indicates that the corrected fingerprint image does not match the pre-stored fingerprint image. For example, the threshold ratio may be, but is not limited to, 85%. When the corrected fingerprint image matches the pre-stored fingerprint image, the electronic device 1 is triggered to perform a preset action. For example, when the corrected fingerprint image matches the pre-stored fingerprint image, the electronic device 1 is triggered to perform screen unlocking, log onto a chat application or a payment application in the electronic device 1, or pay online via a payment application.

Furthermore, when comparing the corrected fingerprint image with the pre-stored fingerprint image, the corrected fingerprint image is divided into multiple corrected fingerprint sub-images, and the pre-stored fingerprint image is divided into multiple pre-stored fingerprint sub-images in the manner in which the corrected fingerprint image is divided, where the number of the pre-stored fingerprint sub-images is the same as that of the corrected fingerprint sub-images. Feature points of the corrected fingerprint sub-images and feature points of the pre-stored fingerprint sub-images are extracted in parallel and compared to determine whether the corrected fingerprint image matches the pre-stored fingerprint image. In one example, since the feature points of the corrected fingerprint sub-images and the feature points of the pre-stored fingerprint sub-images are extracted in parallel and compared, the time taken for fingerprint recognition can be shortened.

In addition, when the corrected fingerprint image is divided into the multiple corrected fingerprint sub-images, the number of the corrected fingerprint sub-image in a first part of the corrected fingerprint image is larger than that of the corrected fingerprint sub-image in a second part of the corrected fingerprint image, where the distribution of feature points in the first part is more compact than the distribution of feature points in the second part. In one example, when the corrected fingerprint image is divided into the multiple corrected fingerprint sub-images, a part of the corrected fingerprint image having more feature points is divided more finely, so as to improve the accuracy of fingerprint recognition.

Figure 27:
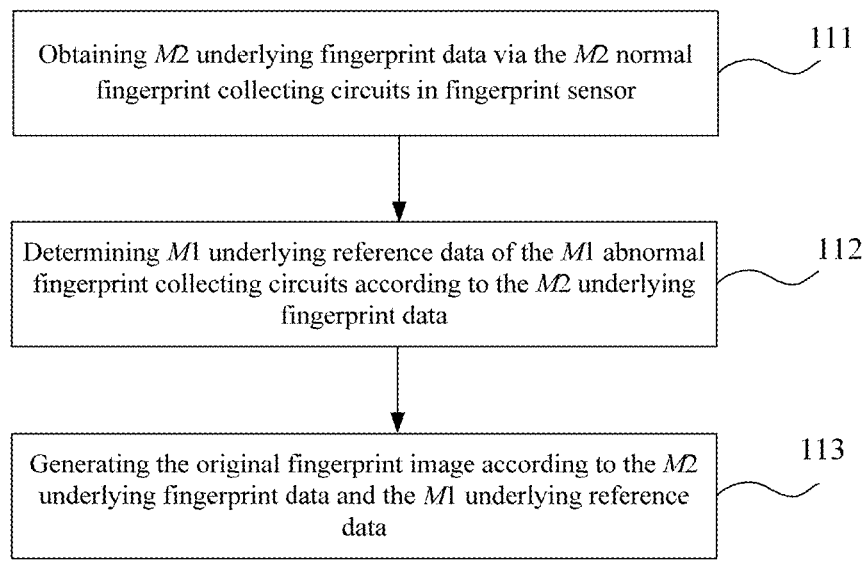
FIG. 27 is a schematic flow chart illustrating an operation at block 110 in the method for fingerprint recognition according to implementations.

Furthermore, when the fingerprint sensor 10 corresponding to the fingerprint collecting region 311 of the electronic device 1 includes M1 abnormal fingerprint collecting circuits 100 and M2 normal fingerprint collecting circuits 100, the original fingerprint image is obtained as follows, where M1 and M2 are positive integers. FIG. 27 is a schematic flowchart illustrating an operation at block 110 in the method for fingerprint recognition according to implementations.

At block 111, M2 underlying fingerprint data is obtained via the M2 normal fingerprint collecting circuits 100 in fingerprint sensor 10.

At block 112, M1 underlying reference data of the M1 abnormal fingerprint collecting circuits 100 is determined according to the M2 underlying fingerprint data.

At block 113, the original fingerprint image is generated according to the M2 underlying fingerprint data and the M1 underlying reference data.

Figure 28:
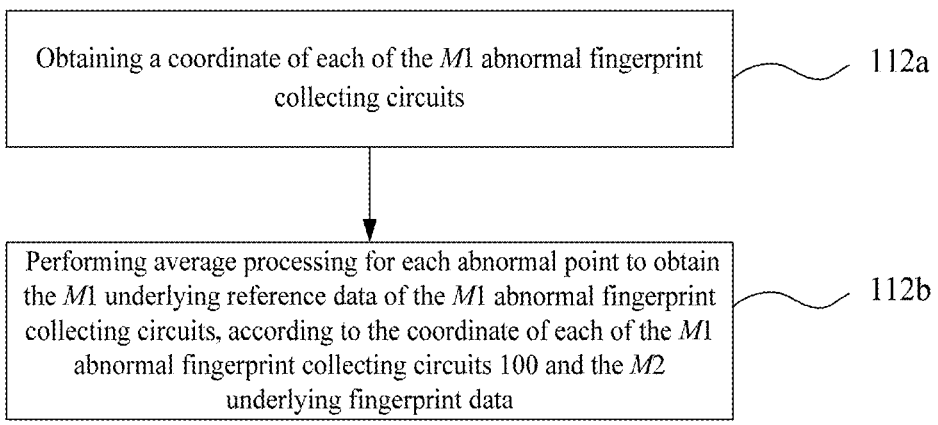
FIG. 28 is a schematic flow chart illustrating an operation at block 112 in the method illustrated in FIG. 27.

In one example, the M1 underlying reference data of the M1 abnormal fingerprint collecting circuits 100 is determined according to the M2 underlying fingerprint data as follows (operations at block 112a and block 112b). FIG. 28 is a schematic flow chart illustrating an operation at block 112 in the method illustrated in FIG. 27.

At block 112a, a coordinate of each of the M1 abnormal fingerprint collecting circuits 100 is obtained.

At block 112b, according to the coordinate of each of the M1 abnormal fingerprint collecting circuits 100 and the M2 underlying fingerprint data, average processing is performed for each abnormal point to obtain the M1 underlying reference data of the M1 abnormal fingerprint collecting circuits 100.

The average processing is performed as follows. Determine, from the M2 normal fingerprint collecting circuits 100, N normal fingerprint collecting circuits 100, where a distance between each of the N normal fingerprint collecting circuits 100 and the abnormal point currently being subject to the average processing is smaller than a preset distance. An average value of N underlying fingerprint data of the N normal fingerprint collecting circuits 100 is calculated. The average value is determined as underlying reference data of the abnormal point currently being subject to the average processing, where N is a positive integer and N is smaller than M2.

As can be seen, the underlying reference data of the abnormal fingerprint collecting circuits 100 is determined according to the underlying fingerprint data of the normal fingerprint collecting circuits 100 of the fingerprint sensor 10. The original fingerprint image of the user's finger is generated according to the underlying fingerprint data and the underlying reference data. As can be seen, by performing the method, the original fingerprint image of the user's finger can still be obtained when the fingerprint sensor 10 includes the abnormal fingerprint collecting circuits 100.

Figure 29:
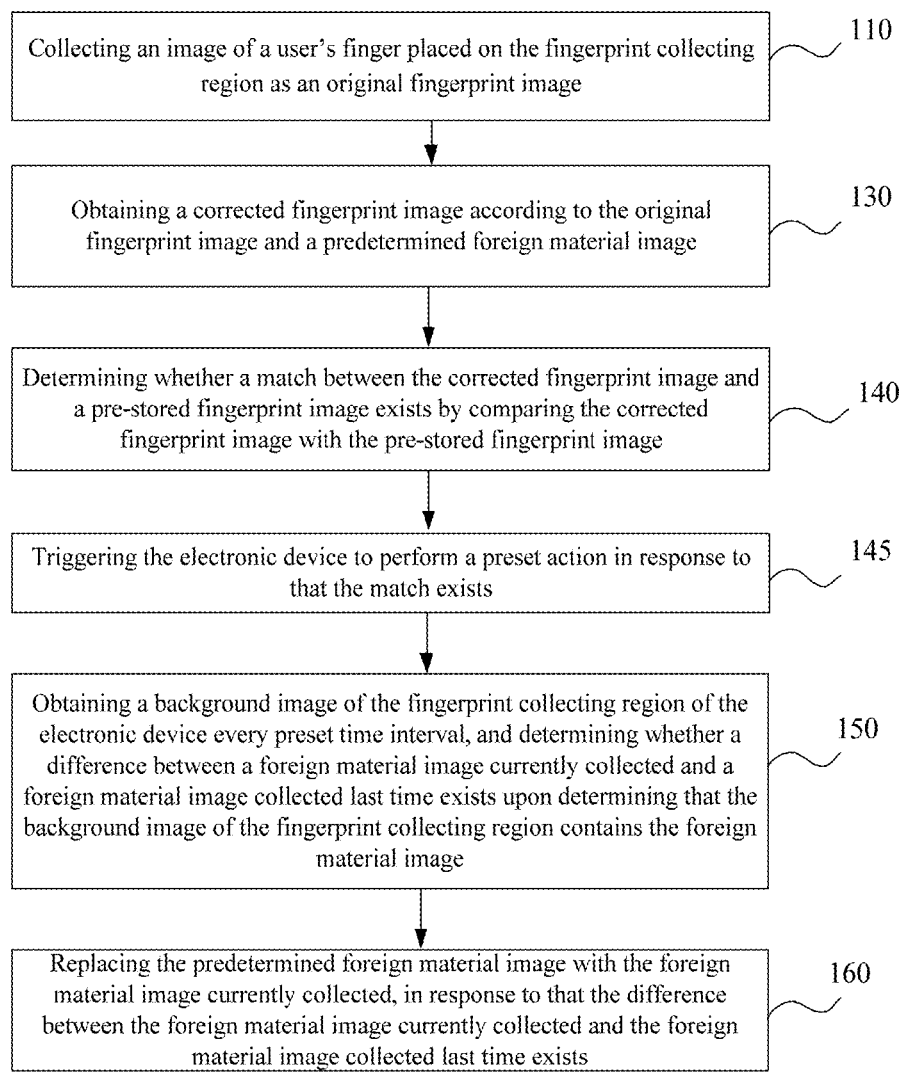
FIG. 29 is a schematic flow chart illustrating a method for fingerprint recognition according to other implementations.

FIG. 29 is a schematic flow chart illustrating a method for fingerprint recognition according to other implementations. The method includes operations at block 150 and block 160 in addition to the operations described above.

At block 150, a background image of the fingerprint collecting region 311 of the electronic device 1 is obtained every preset time interval, and when the background image of the fingerprint collecting region 311 contains a foreign material image, determine whether a difference between the foreign material image currently collected and a foreign material image collected last time exists.

At block 160, the predetermined foreign material image is replaced with the foreign material image currently collected, in response to that the difference between the foreign material image currently collected and the foreign material image collected last time exists.

The preset time interval may be half a month or one month. When the difference between the foreign material image currently collected and the foreign material image collected last time exists, the foreign material image currently collected is determined as the predetermined foreign material image, such that the foreign material image can be updated in time, thereby improving the accuracy of fingerprint recognition.

Figure 30:
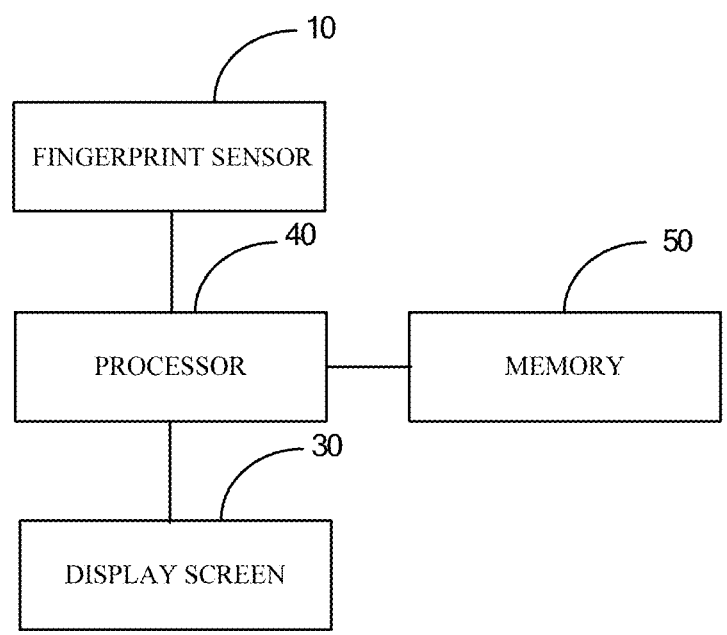
FIG. 30 is a schematic structural diagram illustrating an electronic device according to implementations.

Implementations further provide an electronic device 1. The following describes the electronic device 1 in conjunction with the method for fingerprint recognition described above. As illustrated in FIG. 30, FIG. 30 is a schematic structural diagram illustrating an electronic device according to implementations. The electronic device 1 includes a display screen 30, a fingerprint sensor 10, a processor 40, and a memory 50. The display screen 30 has a display region 310 and a fingerprint collecting region 311, where the fingerprint collecting region 311 is a part of the display region 310 or the whole display region 310.

The fingerprint sensor 10 is disposed below the fingerprint collecting region 311 and configured to collect an image of a user's finger placed on the fingerprint collecting region 311 as an original fingerprint image.

The processor 40 is configured to obtain a corrected fingerprint image according to the original fingerprint image and a predetermined foreign material image, where the predetermined foreign material image is obtained when the user's finger is not placed on the fingerprint collecting region and indicative of a foreign material on the fingerprint collecting region.

The processor 40 is further configured to determine whether a match between the corrected fingerprint image and a pre-stored fingerprint image exists by comparing the corrected fingerprint image with the pre-stored fingerprint image.

The processor 40 is further configured to trigger the electronic device to perform a preset action in response to that the match exists.

In at least one implementation, in terms of obtaining the corrected fingerprint image according to the original fingerprint image and the predetermined foreign material image of the foreign material on the region corresponding to the original fingerprint image, the processor 40 is configured to determine whether an overlap region between the original fingerprint image and the predetermined foreign material image exists and to determine a part of the original fingerprint image other than the overlap region between the original fingerprint image and the predetermined foreign material image as the corrected fingerprint image, in response to that the overlap region between the original fingerprint image and the predetermined foreign material image exists.

In at least one implementation, the fingerprint sensor 10 is further configured to obtain a background image of the fingerprint collecting region 311 of the electronic device 1 and to obtain a brightness value of each of all pixel points of the background image. The processor 40 is further configured to determine that the background image contains the predetermined foreign material image, when an absolute value of a difference value between a brightness value of each of first pixel points of the background image and a brightness value of a second pixel point of the background image is larger than or equal to a first preset brightness value, and a ratio of the number of the first pixel points to the number of all the pixel points of the background image is smaller than a first preset ratio, where all the first pixel points constitute the predetermined foreign material image and the second pixel point is a pixel point of the background image other than the first pixel points.

In at least one implementation, in terms of obtaining the corrected fingerprint image according to the original fingerprint image and the predetermined foreign material image of the foreign material on the region corresponding to the original fingerprint image, the processor 40 is configured to determine whether an overlap region between the original fingerprint image and the predetermined foreign material image exists and to obtain the corrected fingerprint image by subtracting, from the original fingerprint image, part of the predetermined foreign material image corresponding to the overlap region, in response to that the overlap region exists.

In at least one implementation, in terms of obtaining the corrected fingerprint image by subtracting, from the original fingerprint image, the foreign material image corresponding to overlap region, the processor 40 is configured to: obtain a coordinate and a brightness value of each of the first pixel points of the part of the predetermined foreign material image corresponding to the overlap region; obtain the corrected fingerprint image, where a brightness value of each pixel point of the corrected fingerprint image is a difference between a brightness value of a pixel point of the original fingerprint image and a brightness value of one of the first pixel points having the same coordinate as the pixel point of the original fingerprint image.

In at least one implementation, in terms of determining whether the match between the corrected fingerprint image and the pre-stored fingerprint image exists, the processor 40 is configured to: obtain another corrected fingerprint image when the pre-stored fingerprint image contains the predetermined foreign material image, where a brightness value of each pixel point of the other corrected fingerprint image is a difference between a brightness value of a pixel point of the pre-stored fingerprint image and a brightness value of one of the first pixel points having the same coordinate as the pixel point of the pre-stored fingerprint image; determine whether the match between the corrected fingerprint image and the pre-stored fingerprint image exists by comparing the corrected fingerprint image with the other corrected fingerprint image.

In at least one implementation, in terms of obtaining the background image of the fingerprint collecting region 311 of the electronic device 1, the fingerprint sensor 10 is configured to obtain the background image by collecting an image formed by ambient lights passing through the fingerprint collecting region 311 of the electronic device 1, when the electronic device 1 is in black-screen status.

In at least one implementation, in terms of obtaining the background image of the fingerprint collecting region 311 of the electronic device 1, the fingerprint sensor 10 is configured to: obtain a background image by collecting an image formed by ambient lights passing through the fingerprint collecting region 311 of the electronic device 1, when the electronic device 1 is in black-screen status; obtain a second image by collecting an image of the fingerprint collecting region 311 without illumination of ambient lights, when the electronic device 1 is in the black-screen status; obtain the background image, where a brightness value of each pixel point of the background image is a difference between a brightness value of a pixel point of the second image and a brightness value of a pixel point of the first image having the same coordinate as the pixel point of the second image.

In at least one implementation, in terms of obtaining the background image of the fingerprint collecting region 311 of the electronic device 1, the fingerprint sensor 10 is configured to: obtain a background image by collecting an image formed by ambient lights passing through the fingerprint collecting region 311 of the electronic device 1, when the electronic device 1 is in black-screen status; obtain a second image by collecting an image of the fingerprint collecting region 311 without illumination of ambient lights, when the electronic device 1 is in the black-screen status; obtain a third image, where a brightness value of each pixel point of the third image is a difference between a brightness value of a pixel point of the second image and a brightness value of a pixel point of the first image having the same coordinate as the pixel point of the second image; obtain the background image by repairing the third image with a noise image of a collimating lens (OLENS) of the fingerprint sensor 10, where the OLENS is disposed below the fingerprint collecting region 311 of the electronic device 1.

In at least one implementation, the fingerprint sensor 10 is further configured to obtain a background image of the fingerprint collecting region 311 of the electronic device 1 every preset time interval, and the processor 40 is further configured to: determine whether a difference between a foreign material image currently collected and a foreign material image collected last time exists upon determining that the background image of the fingerprint collecting region 311 contains the foreign material image currently collected; replace the predetermined foreign material image in the electronic device with the foreign material image currently collected, in response to that the difference between the foreign material image currently collected and the foreign material image collected last time exists.

Implementations further provide an electronic device 1. The following describes the electronic device 1 in conjunction with the method for fingerprint recognition described above. The electronic device 1 includes a display screen 30, a fingerprint sensor 10, a processor 40, and a memory 50. The display screen 30 has a display region 310 and a fingerprint collecting region 311, where the fingerprint collecting region 311 is a part of the display region 310 or the whole display region 310. The fingerprint sensor 10 is disposed below the fingerprint collecting region 311. The memory 50 stores computer readable programs which, when read and executed by the processor 40, are operable with the processor 40 to perform the method for fingerprint recognition in any of the implementations described above.

Implementations further provide a computer-readable storage medium. The computer-readable storage medium is configured to store computer readable programs which, when executed by the processor, are operable with the processor to perform the method for fingerprint recognition in any of the implementations described above.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a RAM, a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A method for fingerprint recognition for an electronic device, comprising:
    collecting an image of a user's finger placed on a fingerprint collecting region as an original fingerprint image, wherein the fingerprint collecting region is a part of display region or a whole display region of a display screen of the electronic device;
    obtaining a corrected fingerprint image according to the original fingerprint image and a predetermined foreign material image, wherein the predetermined foreign material image is obtained when the user's finger is not placed on the fingerprint collecting region and indicative of a foreign material on the fingerprint collecting region;
    determining whether a match between the corrected fingerprint image and a pre-stored fingerprint image exists by comparing the corrected fingerprint image with the pre-stored fingerprint image; and
    triggering the electronic device to perform a preset action in response to that the match exists;
    wherein obtaining the corrected fingerprint image comprises:
        determining whether an overlap region between the original fingerprint image and the predetermined foreign material image exists; and
        determining a part of the original fingerprint image other than the overlap region between the original fingerprint image and the predetermined foreign material image as the corrected fingerprint image, in response to that the overlap region between the original fingerprint image and the predetermined foreign material image exists.

2. The method of claim 1, further comprising:
    obtaining a background image of the fingerprint collecting region of the electronic device;
    obtaining a brightness value of each of all pixel points of the background image; and
    determining that the background image contains the predetermined foreign material image, when an absolute value of a difference value between a brightness value of each of first pixel points of the background image and a brightness value of a second pixel point of the background image is larger than or equal to a first preset brightness value, and a ratio of the number of the first pixel points to the number of all the pixel points of the background image is smaller than a first preset ratio, wherein all the first pixel points constitute the predetermined foreign material image, and the second pixel point is a pixel point of the background image other than the first pixel points.

3. The method of claim 2, wherein determining whether the match between the corrected fingerprint image and the pre-stored fingerprint image exists by comparing the corrected fingerprint image with the pre-stored fingerprint image comprises:

obtaining another corrected fingerprint image when the pre-stored fingerprint image contains the predetermined foreign material image, wherein a brightness value of each pixel point of the other corrected fingerprint image is a difference between a brightness value of a pixel point of the pre-stored fingerprint image and a brightness value of one of the first pixel points having the same coordinate as the pixel point of the pre-stored fingerprint image; and determining whether the match between the corrected fingerprint image and the pre-stored fingerprint image exists by comparing the corrected fingerprint image with the other corrected fingerprint image.

4. The method of claim 2, wherein obtaining the background image of the fingerprint collecting region of the electronic device comprises:

obtaining a first image by collecting an image formed by ambient lights passing through the fingerprint collecting region of the electronic device, when the electronic device is in black-screen status;

obtaining a second image by collecting an image of the fingerprint collecting region without illumination of ambient lights, when the electronic device is in the black-screen status; and obtaining the background image, wherein a brightness value of each pixel point of the background image is a difference between a brightness value of a pixel point of the second image and a brightness value of a pixel point of the first image having the same coordinate as the pixel point of the second image.

5. The method of claim 2, wherein obtaining the background image of the fingerprint collecting region of the electronic device comprises:

obtaining a first image by collecting an image formed by ambient lights passing through the fingerprint collecting region of the electronic device, when the electronic device is in black-screen status;

obtaining a second image by collecting an image of the fingerprint collecting region without illumination of ambient lights, when the electronic device is in the black-screen status;

obtaining a third image, wherein a brightness value of each pixel point of the third image is a difference between a brightness value of a pixel point of the second image and a brightness value of a pixel point of the first image having the same coordinate as the pixel point of the second image; and obtaining the background image by repairing the third image with a noise image of a collimating lens (OLENS) of the electronic device, wherein the OLENS is disposed below the fingerprint collecting region.

6. The method of claim 1, further comprising:

obtaining a background image of the fingerprint collecting region of the electronic device every preset time interval, and determining whether a difference between a foreign material image currently collected and a foreign material image collected last time exists upon determining that the background image of the fingerprint collecting region contains the foreign material image currently collected; and replacing the predetermined foreign material image in the electronic device with the foreign material image currently collected, in response to that the difference between the foreign material image currently collected and the foreign material image collected last time exists.

7. An electronic device, comprising:

a display screen having a display region and a fingerprint collecting region, wherein the fingerprint collecting region is a part of the display region or a whole display region;

a fingerprint sensor disposed below the fingerprint collecting region and configured to collect an image of a user's finger placed on the fingerprint collecting region as an original fingerprint image;

a processor; and a memory storing computer programs which, when executed by the processor, are configured to:

obtain a corrected fingerprint image according to the original fingerprint image and a predetermined foreign material image, wherein the predetermined foreign material image is obtained when the user's finger is not placed on the fingerprint collecting region and indicative of a foreign material on the fingerprint collecting region;

determine whether a match between the corrected fingerprint image and a pre-stored fingerprint image exists by comparing the corrected fingerprint image with the pre-stored fingerprint image; and trigger the electronic device to perform a preset action in response to that the match exists;

wherein the processor is further configured to:

determine whether an overlap region between the original fingerprint image and the predetermined foreign material image exists; and determine a part of the original fingerprint image other than the overlap region between the original fingerprint image and the predetermined foreign material image as the corrected fingerprint image, in response to that the overlap region between the original fingerprint image and the predetermined foreign material image exists.

8. The electronic device of claim 7, wherein the fingerprint sensor is further configured to:

obtain a background image of the fingerprint collecting region of the electronic device; and obtain a brightness value of each of all pixel points of the background image; and wherein the processor is further configured to:

determine that the background image contains the predetermined foreign material image, when an absolute value of a difference value between a brightness value of each of first pixel points of the background image and a brightness value of a second pixel point of the background image is larger than or equal to a first preset brightness value, and a ratio of the number of the first pixel points to the number of all the pixel points of the background image is smaller than a first preset ratio, wherein all the first pixel points constitute the predetermined foreign material image and the second pixel point is a pixel point of the background image other than the first pixel points.

9. The electronic device of claim 8, wherein determining whether the match between the corrected fingerprint image and the pre-stored fingerprint image exists includes:
obtaining another corrected fingerprint image when the pre-stored fingerprint image contains the predetermined foreign material image, wherein a brightness value of each pixel point of the other corrected fingerprint image is a difference between a brightness value of a pixel point of the pre-stored fingerprint image and a brightness value of one of the first pixel points having the same coordinate as the pixel point of the pre-stored fingerprint image corresponding to the overlap region; and
determining whether the match between the corrected fingerprint image and the pre-stored fingerprint image exists by comparing the corrected fingerprint image with the other corrected fingerprint image.

10. The electronic device of claim 8, wherein obtaining the background image of the fingerprint collecting region of the electronic device includes:
obtain the background image by collecting an image formed by ambient lights passing through the fingerprint collecting region of the electronic device, when the electronic device is in black-screen status.

11. The electronic device of claim 8, wherein obtaining the background image of the fingerprint collecting region of the electronic device includes:
obtain a first image by collecting an image formed by ambient lights passing through the fingerprint collecting region of the electronic device, when the electronic device is in black-screen status;
obtain a second image by collecting an image of the fingerprint collecting region without illumination of ambient lights, when the electronic device is in the black-screen status; and
obtain the background image, wherein a brightness value of each pixel point of the background image is a difference between a brightness value of a pixel point of the second image and a brightness value of a pixel point of the first image having the same coordinate as the pixel point of the second image.

12. The electronic device of claim 8, wherein obtaining the background image of the fingerprint collecting region of the electronic device includes:
obtain a first image by collecting an image formed by ambient lights passing through the fingerprint collecting region of the electronic device, when the electronic device is in black-screen status;
obtain a second image by collecting an image of the fingerprint collecting region without illumination of ambient lights, when the electronic device is in the black-screen status;
obtain a third image, wherein a brightness value of each pixel point of the third image is a difference between a brightness value of a pixel point of the second image and a brightness value of a pixel point of the first image having the same coordinate as the pixel point of the second image; and
obtain the background image by repairing the third image with a noise image of a collimating lens (OLENS) of the fingerprint sensor, wherein the OLENS is disposed below the fingerprint collecting region.

13. The electronic device of claim 7, wherein the fingerprint sensor is further configured to:
obtain a background image of the fingerprint collecting region of the electronic device every preset time interval, and
wherein the processor is configured to:
determine the background image contains the foreign material image currently collected;
determine whether a difference between a foreign material image currently collected and a foreign material image collected last time exists; and
replace the predetermined foreign material image in the electronic device with the foreign material image currently collected, in response to that the difference between the foreign material image currently collected and the foreign material image collected last time exists.

14. A non-transitory computer-readable storage medium configured to store computer readable programs which, when executed by a processor, are operable with the processor to:
collect an image of a user's finger placed on a fingerprint collecting region as an original fingerprint image, wherein the fingerprint collecting region is a part of display region or a whole display region of a display screen of an electronic device;
obtain a corrected fingerprint image according to the original fingerprint image and a predetermined foreign material image, wherein the predetermined foreign material image is obtained when the user's finger is not placed on the fingerprint collecting region and indicative of a foreign material on the fingerprint collecting region;
determine whether a match between the corrected fingerprint image and a pre-stored fingerprint image exists by comparing the corrected fingerprint image with the pre-stored fingerprint image; and
trigger the electronic device to perform a preset action in response to that the match exists;
wherein obtaining the corrected fingerprint image comprises:
determining whether an overlap region between the original fingerprint image and the predetermined foreign material image exists; and
determining a part of the original fingerprint image other than the overlap region between the original fingerprint image and the predetermined foreign material image as the corrected fingerprint image, in response to that the overlap region between the original fingerprint image and the predetermined foreign material image exists.

15. The non-transitory computer-readable storage medium of claim 14, wherein the computer readable programs are further operable with the processor to:
obtain a background image of the fingerprint collecting region of the electronic device;
obtain a brightness value of each of all pixel points of the background image; and
determine that the background image contains the predetermined foreign material image, when an absolute value of a difference value between a brightness value of each of first pixel points of the background image and a brightness value of a second pixel point of the background image is larger than or equal to a first preset brightness value, and a ratio of the number of the first pixel points to the number of all the pixel points of the background image is smaller than a first preset ratio, wherein all the first pixel points constitute the predetermined foreign material image and the second pixel point is a pixel point of the background image other than the first pixel points.

16. The non-transitory computer-readable storage medium of claim 15, wherein the computer readable programs operable with the processor to determine whether the match between the corrected fingerprint image and the pre-stored fingerprint image exists by comparing the corrected fingerprint image with the pre-stored fingerprint image are operable with the processor to:
- obtain another corrected fingerprint image when the pre-stored fingerprint image contains the predetermined foreign material image, wherein a brightness value of each pixel point of the other corrected fingerprint image is a difference between a brightness value of a pixel point of the pre-stored fingerprint image and a brightness value of one of the first pixel points having the same coordinate as the pixel point of the pre-stored fingerprint image; and
- determine whether the match between the corrected fingerprint image and the pre-stored fingerprint image exists by comparing the corrected fingerprint image with the other corrected fingerprint image.

17. The non-transitory computer-readable storage medium of claim 15, wherein the computer readable programs operable with the processor to obtain the background image of the fingerprint collecting region of the electronic device are operable with the processor to:
- obtain a first image by collecting an image formed by ambient lights passing through the fingerprint collecting region of the electronic device, when the electronic device is in black-screen status;
- obtain a second image by collecting an image of the fingerprint collecting region without illumination of ambient lights, when the electronic device is in the black-screen status; and
- obtain the background image, wherein a brightness value of each pixel point of the background image is a difference between a brightness value of a pixel point of the second image and a brightness value of a pixel point of the first image having the same coordinate as the pixel point of the second image.

18. The non-transitory computer-readable storage medium of claim 15, wherein the computer readable programs operable with the processor to obtain the background image of the fingerprint collecting region of the electronic device are operable with the processor to:
- obtain a first image by collecting an image formed by ambient lights passing through the fingerprint collecting region of the electronic device, when the electronic device is in black-screen status;
- obtain a second image by collecting an image of the fingerprint collecting region without illumination of ambient lights, when the electronic device is in the black-screen status;
- obtain a third image, wherein a brightness value of each pixel point of the third image is a difference between a brightness value of a pixel point of the second image and a brightness value of a pixel point of the first image having the same coordinate as the pixel point of the second image; and
- obtain the background image by repairing the third image with a noise image of a collimating lens (OLENS) of the electronic device, wherein the (OLENS) is disposed below the fingerprint collecting region.

19. The non-transitory computer-readable storage medium of claim 14, wherein the computer readable programs are further operable with the processor to:
- obtain a background image of the fingerprint collecting region of the electronic device every preset time interval;
- determine the background image contains the foreign material image currently collected;
- determine whether a difference between a foreign material image currently collected and a foreign material image collected last time exists; and
- replace the predetermined foreign material image in the electronic device with the foreign material image currently collected, in response to that the difference between the foreign material image currently collected and the foreign material image collected last time exists.

* * * * *